US007582481B2

(12) United States Patent
Mae

(10) Patent No.: US 7,582,481 B2
(45) Date of Patent: Sep. 1, 2009

(54) METHOD OF MULTIPLE REACTION IN MICROREACTOR, AND MICROREACTOR

(75) Inventor: Kazuhiro Mae, Kyoto (JP)

(73) Assignee: FUJIFILM Corporation, Tokyo (JP)

( * ) Notice: Subject to any disclaimer, the term of this patent is extended or adjusted under 35 U.S.C. 154(b) by 628 days.

(21) Appl. No.: 11/081,769

(22) Filed: Mar. 17, 2005

(65) Prior Publication Data

US 2005/0207952 A1 Sep. 22, 2005

(30) Foreign Application Priority Data

Mar. 17, 2004 (JP) ............................ 2004-076714

(51) Int. Cl.
*G01N 35/00* (2006.01)

(52) U.S. Cl. .......................... 436/43; 422/99; 422/100; 422/129; 422/130

(58) Field of Classification Search ...................... None
See application file for complete search history.

(56) References Cited

U.S. PATENT DOCUMENTS

| | | | | |
|---|---|---|---|---|
| 6,264,900 | B1 | 7/2001 | Schubert et al. | |
| 6,838,232 | B2 * | 1/2005 | Nagasawa et al. | 430/449 |
| 6,902,934 | B1 * | 6/2005 | Bergh et al. | 436/37 |
| 6,919,058 | B2 * | 7/2005 | Andersson et al. | 506/33 |
| 7,275,858 | B2 * | 10/2007 | Andersson et al. | 366/341 |
| 7,300,199 | B2 * | 11/2007 | Andersson et al. | 366/341 |
| 2004/0027915 | A1 | 2/2004 | Lowe et al. | |

FOREIGN PATENT DOCUMENTS

| | | | |
|---|---|---|---|
| JP | 09-512742 | A | 12/1997 |
| JP | 2002-282682 | A | 10/2002 |
| JP | 2003-502144 | A | 1/2003 |
| WO | WO 00/62913 | A1 | 10/2000 |
| WO | WO 00/78438 | A1 | 12/2000 |

* cited by examiner

*Primary Examiner*—N. Bhat
(74) *Attorney, Agent, or Firm*—Sughrue Mion, PLLC

(57) ABSTRACT

When fluids A and B are caused to flow together from a fluid introduction portion into a microreactionchannel, they are divided into a plurality of fluid segments A and B in a diametral section of the microreactionchannel at the entrance side, and are mixed with each other by molecular diffusion to perform multiple reaction while being caused to flow as laminar flows.

7 Claims, 41 Drawing Sheets

CASE OF ARRANGING
LARGE NUMBERS OF SEGMENTS

CASE OF USING
PERIODIC BOUNDARY (DOTTED LINE)

FIG.11A NUMBER OF SEGMENTS 4 (TWO PAIRS OF SEGMENTS A AND B)
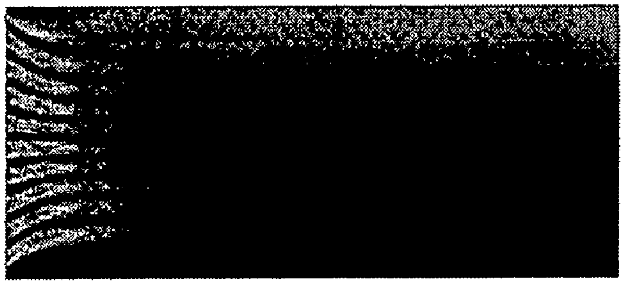
FIG.11B NUMBER OF SEGMENTS 20 (TEN PAIRS OF SEGMENTS A AND B)
FIG.11C PERIODIC BOUNDARY
DIFFERENT DISTRIBUTIONS OF MOLAR FRACTION $y_R$ OF R DEPENDENT ON NUMBER OF SEGMENTS (ENTRANCE ON LEFT-HAND SIDE)

FIG.12

| | $\gamma_{R}$, max |
|---|---|
| PERIODIC BOUNDARY | 0.107 |
| NUMBER OF SEGMENTS 40 (TWENTY PAIRS OF SEGMENTS A AND B) | 0.109 |
| NUMBER OF SEGMENTS 20 (TEN PAIRS OF SEGMENTS A AND B) | 0.109 |
| NUMBER OF SEGMENTS 12 (SIX PAIRS OF SEGMENTS A AND B) | 0.111 |
| NUMBER OF SEGMENTS 4 (TWO PAIRS OF SEGMENTS A AND B) | 0.117 |
| NUMBER OF SEGMENTS 2 (ONE PAIR OF SEGMENTS A AND B) | 0.106 |

FIG.13A ARRANGEMENT 1: CASE OF ARRANGEMENT IN ONE ROW
FIG.13B ARRANGEMENT 2:
CASE OF PERIODIC ARRANGEMENT IN ONE ROW
(DOTTED LINE INDICATING PERIODIC BOUNDARY)
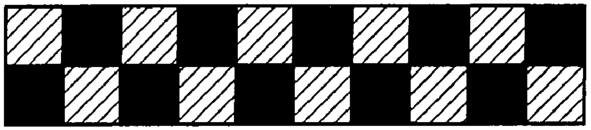
FIG.13C ARRANGEMENT 3:
CASE OF ARRANGEMENT IN TWO ROWS
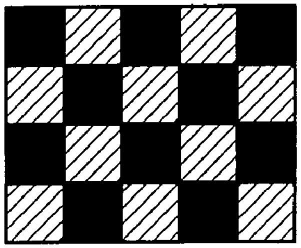
FIG.13D ARRANGEMENT 4:
CASE OF PERIODIC ARRANGEMENT IN FOUR ROWS
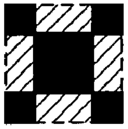
FIG.13E ARRANGEMENT 5:
CASE OF VERTICAL PERIODIC ARRANGEMENT
(DOTTED LINE INDICATING PERIODIC BOUNDARY)

FIG.15

| ARRANGEMENT 5 | | ARRANGEMENT 2 | | | |
|---|---|---|---|---|---|
| $W_5$ [μm] | SPECIFIC SURFACE AREA [$m^{-1}$] | $W_2$ [μm] | SPECIFIC SURFACE AREA [$m^{-1}$] | $W_b/W_e$ | $Y_{R,max}$ |
| 25 | 80000 | 16 | 62500 | 0.64 | 0.325 |
| 50 | 40000 | 33 | 30303 | 0.66 | 0.269 |
| 100 | 20000 | 65 | 15385 | 0.65 | 0.192 |
| 200 | 10000 | 120 | 8333 | 0.60 | 0.131 |
| 300 | 6667 | 155 | 6452 | 0.52 | 0.111 |
| 400 | 5000 | 175 | 5714 | 0.44 | 0.102 |
| 500 | 4000 | 185 | 5405 | 0.37 | 0.099 |

$W_5$=25 μm, $W_2$=16 μm ($Y_{R,max}$=0. 325)

$W_5$=500 μm, $W_2$=185 μm ($Y_{R,max}$=0. 099)

SYMMETRY BOUNDARY
ASPECT RATIO 0.5
(DEPTH50 μm)

ASPECT RATIO 1
(DEPTH100 μm)

ASPECT RATIO 2
(DEPTH200 μm)
RECTANGULAR SEGMENTS HAVING DIFFERENT ASPECT RATIOS
(SEGMENT WIDTH 100 gym, NUMBER OF SEGMENTS 2)

ONE PAIR OF SEGMENTS

TEN PAIRS OF SEGMENTS

ONE-ROW PERIODIC BOUNDARY

INFLUENCE OF RECTANGULAR SEGMENT ASPECT RATIO ON RELATIONSHIP BETWEEN $Y_R$ AND $x_A$

NUMBER OF SEGMENTS 2

NUMBER OF SEGMENTS 20

PERIODIC BOUNDARY

FLOW RATE DISTRIBUTION IN REACTOR EXIT SECTION
(SEGMENT IS 100 $\mu$m WIDTH AND 100 $\mu$m DEEP)

FIG.20

CHANGES IN MAXIMUM FLOW RATE DEPENDENT ON ASPECT RATIO

| SEGMENT DEPTH [μm] | MAXIMUM FLOW RATE [m/s] | | |
|---|---|---|---|
| | ONE PAIR OF SEGMENTS | TEN PAIRS OF SEGMENTS | PERIODIC BOUNDARY |
| 50 | 0.000861 | 0.000742 | 0.000746 |
| 100 | 0.000966 | 0.000755 | 0.000746 |
| 400 | 0.000968 | 0.000837 | 0.000746 |
| 1000 | 0.000838 | 0.000972 | 0.000746 |

ONE PAIR OF SEGMENTS

ONE-ROW PERIODIC ARRANGEMENT

VERTICAL PERIODIC ARRANGEMENT

INFLUENCE OF RECTANGULAR SEGMENT ASPECT RATIO ON RELATIONSHIP BETWEEN YR AND xA

FIG.22

CORRESPONDENCE IN SPECIFIC AREA OF SQUARE SEGMENTS TO WHICH RECTANGULAR SEGMENTS CORRESPOND

| LENGTH OF ONE SIDE OF ORIGINAL SQUARE [μm] | RECTANGLE | | | | $Y_{R,max}$ MATCHING SQUARE | | | |
|---|---|---|---|---|---|---|---|---|
| | ASPECT RATIO | WIDTH $W_1$ [μm] | HEIGHT H [μm] | SPECIFIC SURFACE AREA [$m^{-1}$] | LENGTH OF ONE SIDE $W_2$ [μm] | SPECIFIC SURFACE AREA [$m^{-1}$] | $W_2/W_1$ | $Y_{R,max}$ |
| 100 | 1.56 | 80 | 125 | 20500 | 96 | 20833 | 1.20 | 0.198 |
| | 2 | 71 | 141 | 21177 | 90 | 22222 | 1.27 | 0.204 |
| | 4 | 50 | 200 | 25000 | 68 | 29412 | 1.36 | 0.235 |
| | 8 | 35 | 283 | 32105 | 49 | 40816 | 1.40 | 0.272 |
| | 12 | 29 | 346 | 37373 | 42 | 47619 | 1.45 | 0.289 |
| | 16 | 25 | 400 | 42500 | 35 | 57143 | 1.40 | 0.303 |
| | 25 | 20 | 500 | 52000 | 29 | 68966 | 1.45 | 0.319 |
| 200 | 4 | 100 | 400 | 12500 | 140 | 14286 | 1.40 | 0.160 |
| | 16 | 50 | 800 | 21250 | 72 | 27778 | 1.44 | 0.229 |
| 400 | 4 | 200 | 800 | 6250 | 310 | 6452 | 1.55 | 0.110 |
| | 16 | 100 | 1600 | 10625 | 155 | 12903 | 1.55 | 0.151 |

RECTANGLE : $W_1=25\mu m$, $H=400\mu m$

SQUARE : $W_2=35\mu m$

RECTANGLE : $W_1=100\mu m$, $H=1600\mu m$

SQUARE : $W_2=155\mu m$

RELATIONSHIP BETWEEN YR AND xA WHEN $Y_{R,max}$ BY RECTANGULAR SEGMENTS AND $Y_{R,max}$ BY SQURE SEGMENTS COINCIDE WITH EACH OTHER

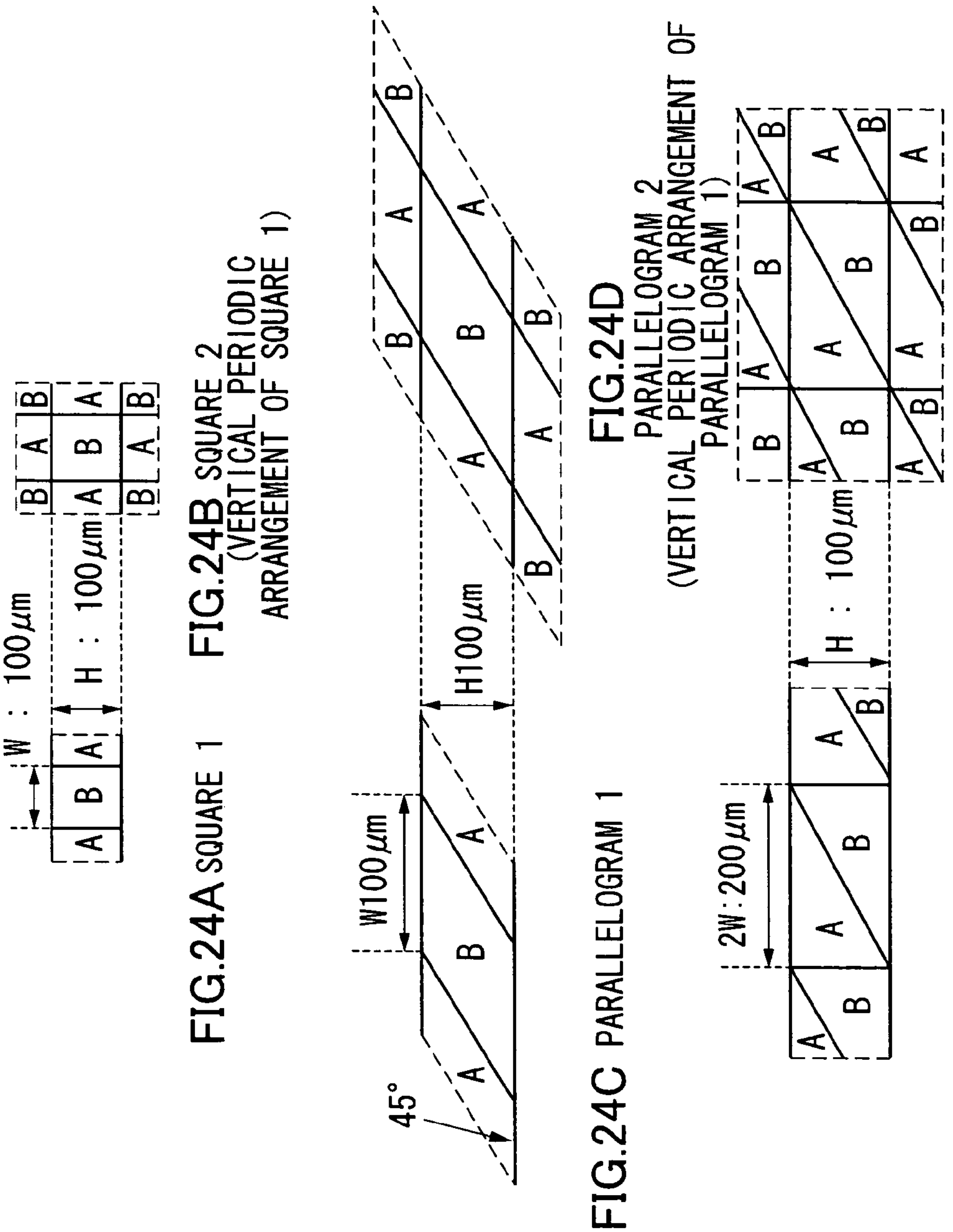
FIG.24A SQUARE 1
FIG.24B SQUARE 2 (VERTICAL PERIODIC ARRANGEMENT OF SQUARE 1)
FIG.24C PARALLELOGRAM 1
FIG.24D PARALLELOGRAM 2 (VERTICAL PERIODIC ARRANGEMENT OF PARALLELOGRAM 1)
FIG.24E TRIANGLE 1
FIG.24F TRIANGLE 2 (VERTICAL PERIODIC ARRANGEMENT OF TRIANGLE 1)
SEGMENTS OF DIFFERENT SHAPES
(DOTTED LIGHT INDICATING PERIODIC BOUNDARY, THICK LINE INDICATING SYMMETRY BOUNDARY)

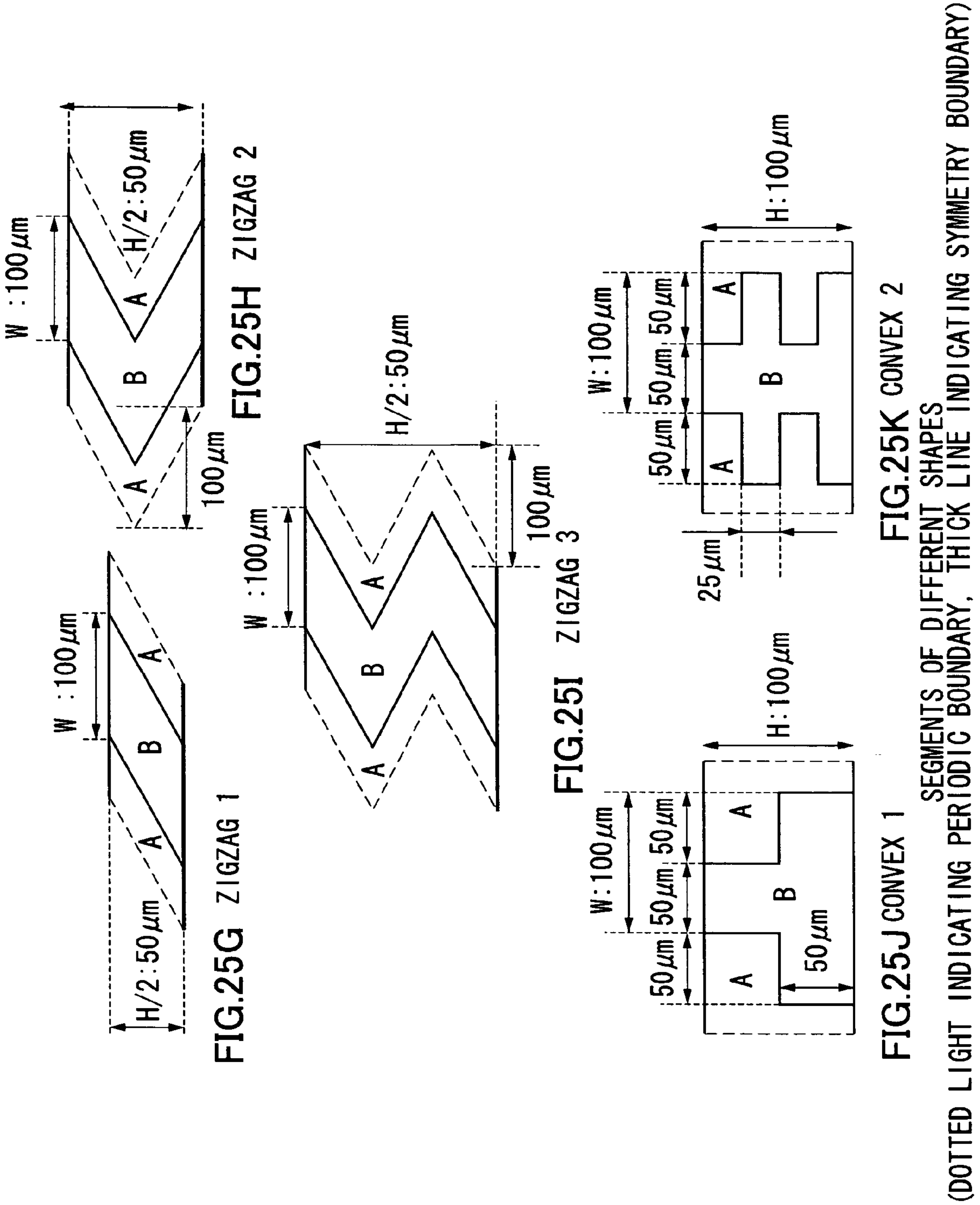
FIG.25G ZIGZAG 1
FIG.25H ZIGZAG 2
FIG.25I ZIGZAG 3
FIG.25J CONVEX 1
FIG.25K CONVEX 2
SEGMENTS OF DIFFERENT SHAPES
(DOTTED LIGHT INDICATING PERIODIC BOUNDARY, THICK LINE INDICATING SYMMETRY BOUNDARY)

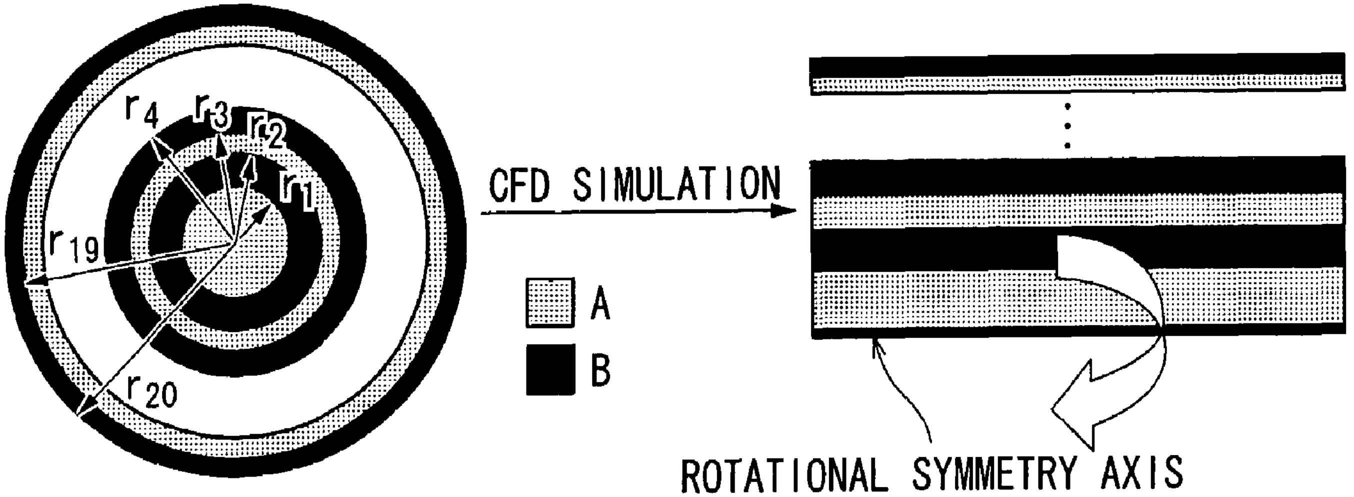
FIG.26L CONCENTRIC CIRCLES
SEGMENTS OF DIFFERENT SHAPES
(DOTTED LINE INDICATING PERIODIC BOUNDARY, THICK LINE INDICATING SYMMETRY BOUNDARY)

FIG.27

RADIUS OF CONVENTRIC CIRCLES

| CONCENTRIC CIRCLE | RADIUS [μm] | CONCENTRIC CIRCLE | RADIUS [μm] | CONCENTRIC CIRCLE | RADIUS [μm] |
|---|---|---|---|---|---|
| $r_1$ | 56.42 | $r_8$ | 159.58 | $r_{15}$ | 218.51 |
| $r_2$ | 79.79 | $r_9$ | 169.26 | $r_{16}$ | 225.68 |
| $r_3$ | 97.72 | $r_{10}$ | 178.41 | $r_{17}$ | 232.62 |
| $r_4$ | 112.84 | $r_{11}$ | 187.12 | $r_{18}$ | 239.37 |
| $r_5$ | 126.16 | $r_{12}$ | 195.44 | $r_{19}$ | 245.92 |
| $r_6$ | 138.20 | $r_{13}$ | 203.42 | $r_{20}$ | 252.31 |
| $r_7$ | 149.27 | $r_{14}$ | 211.10 | | |

FIG.28

METHOD OF DISCRETIZATION IN SIMULATION ON EACH SHAPE

| RAW MATERIAL SUPPLY SEGMENT SHAPE (ARRANGEMENT) | ABBREVIATED NAME | MESH CHAPE | TOTAL NUMBER OF MESHES | SPECIFIC SURFACE AREA [$m^{-1}$] |
|---|---|---|---|---|
| SQUARE (ONE-HORIZONTAL-ROW PERIODIC) | SQUARE 1 | RECTANGLE | 40, 000 | 10000 |
| SQUARE (VERTICAL PERIODIC) | SQUARE 2 | RECTANGLE | 80, 000 | 20000 |
| PARALLELOGRAM (ONE-HORIZONTAL-ROW PERIODIC) | PARALLELOGRAM 1 | HEXAHEDRON | 40, 000 | 14142 |
| PARALLELOGRAM (VERTICAL PERIODIC) | PARALLELOGRAM 2 | HEXAHEDRON | 80, 000 | 24142 |
| TRIANGLE (ONE-HORIZONTAL-ROW PERIODIC) | TRIANGLE 1 | HEXAHEDRON | 67, 600 | 16180 |
| TRIANGLE (VERTICAL PERIODIC) | TRIANGLE 2 | HEXAHEDRON | 126, 000 | 26180 |
| ZIGZAG SHAPE 1 | ZIGZAG 1 | HEXAHEDRON | 40, 000 | 22361 |
| ZIGZAG SHAPE 2 | ZIGZAG 2 | HEXAHEDRON | 56, 000 | 41231 |
| ZIGZAG SHAPE 3 | ZIGZAG 3 | HEXAHEDRON | 84, 000 | 60828 |
| CONVEX SHAPE 1 | CONVEX 1 | RECTANGLE | 42, 000 | 15000 |
| CONVEX SHAPE 2 | CONVEX 2 | RECTANGLE | 67, 200 | 25000 |
| CONCENTRIC CIRCLES | CONCENTRIC CIRCLES | RECTANGLE | 40, 000 | 101373 |

SQUARE, PARALLELOGRAM, TRIANGLE

ZIGZAG SHAPE, CONVEX SHAPE, CONCENTRIC CIRCLES

INFLUENCE OF SEGMENT SHAPE ON RELATIONSHIP BETWEEN $Y_R$ AND $x_A$

FIG.30

SIZE CORRESPONDENCE BETWEEN $YR_{R,max}$ MATCHING SEGMENTS OF DIFFERENT SHAPES AND RECTANGULAR SEGMENTS

| SHAPE | SIZE [μm] W | SIZE [μm] H | SPECIFIC SURFACE AREA [$m^{-1}$] | W [μm] OF CORRESPONDING RECTANGLE 1 (H=100 μm) | SPECIFIC SURFACE AREA [$m^{-1}$] | $Y_{R,max}$ |
|---|---|---|---|---|---|---|
| PARALLELOGRAM 1 | 25 | 100 | 41231 | 24 | 41667 | 0.299 |
| | 100 | 100 | 14142 | 71 | 14085 | 0.179 |
| | 400 | 100 | 10308 | 112 | 8929 | 0.137 |
| TRIANGLE 1 | 25 | 100 | 42361 | 40 | 25000 | 0.249 |
| | 100 | 100 | 16180 | 71 | 14085 | 0.179 |
| | 400 | 100 | 11328 | 104 | 9615 | 0.143 |
| ZIGZAG 1 | 25 | 100 | 44721 | 23 | 43478 | 0.304 |
| | 100 | 100 | 22361 | 55 | 18182 | 0.211 |
| | 400 | 100 | 20156 | 68 | 14706 | 0.185 |
| ZIGZAG 2 | 25 | 100 | 56569 | 20 | 50000 | 0.313 |
| | 100 | 100 | 41231 | 40 | 25000 | 0.247 |
| | 400 | 100 | 40078 | 44 | 22727 | 0.235 |
| ZIGZAG 3 | 25 | 100 | 72111 | 18 | 55556 | 0.318 |
| | 100 | 100 | 60828 | 32 | 31250 | 0.270 |
| | 400 | 100 | 60052 | 35 | 28571 | 0.262 |
| CONVEX 1 | 25 | 100 | 45000 | 35 | 28571 | 0.262 |
| | 100 | 100 | 15000 | 75 | 13333 | 0.175 |
| | 400 | 100 | 7500 | 120 | 8333 | 0.130 |
| CONVEX 2 | 25 | 100 | 55000 | 25 | 40000 | 0.296 |
| | 100 | 100 | 25000 | 56 | 17857 | 0.207 |
| | 400 | 100 | 17500 | 82 | 12195 | 0.167 |
| CONCENTRIC CIRCLES | 100 | 100 | 101373 | 19 | 52632 | 0.318 |

| SHAPE | SIZE [μm] W | SIZE [μm] H | SPECIFIC SURFACE AREA [$m^{-1}$] | W (= H) OF CORRESPONDING RECTANGLE 2 (=H) [μm] | SPECIFIC SURFACE AREA [$m^{-1}$] | $Y_{R,max}$ |
|---|---|---|---|---|---|---|
| PARALLELOGRAM 2 | 25 | 25 | 96569 | 29 | 68966 | 0320 |
| | 100 | 100 | 24142 | 91 | 21978 | 0.203 |
| | 400 | 400 | 6036 | 142 | 14085 | 0.158 |
| TRIANGLE 2 | 25 | 25 | 104721 | 26 | 76923 | 0.325 |
| | 100 | 100 | 26180 | 75 | 26667 | 0.225 |
| | 400 | 400 | 6545 | 234 | 8547 | 0.123 |

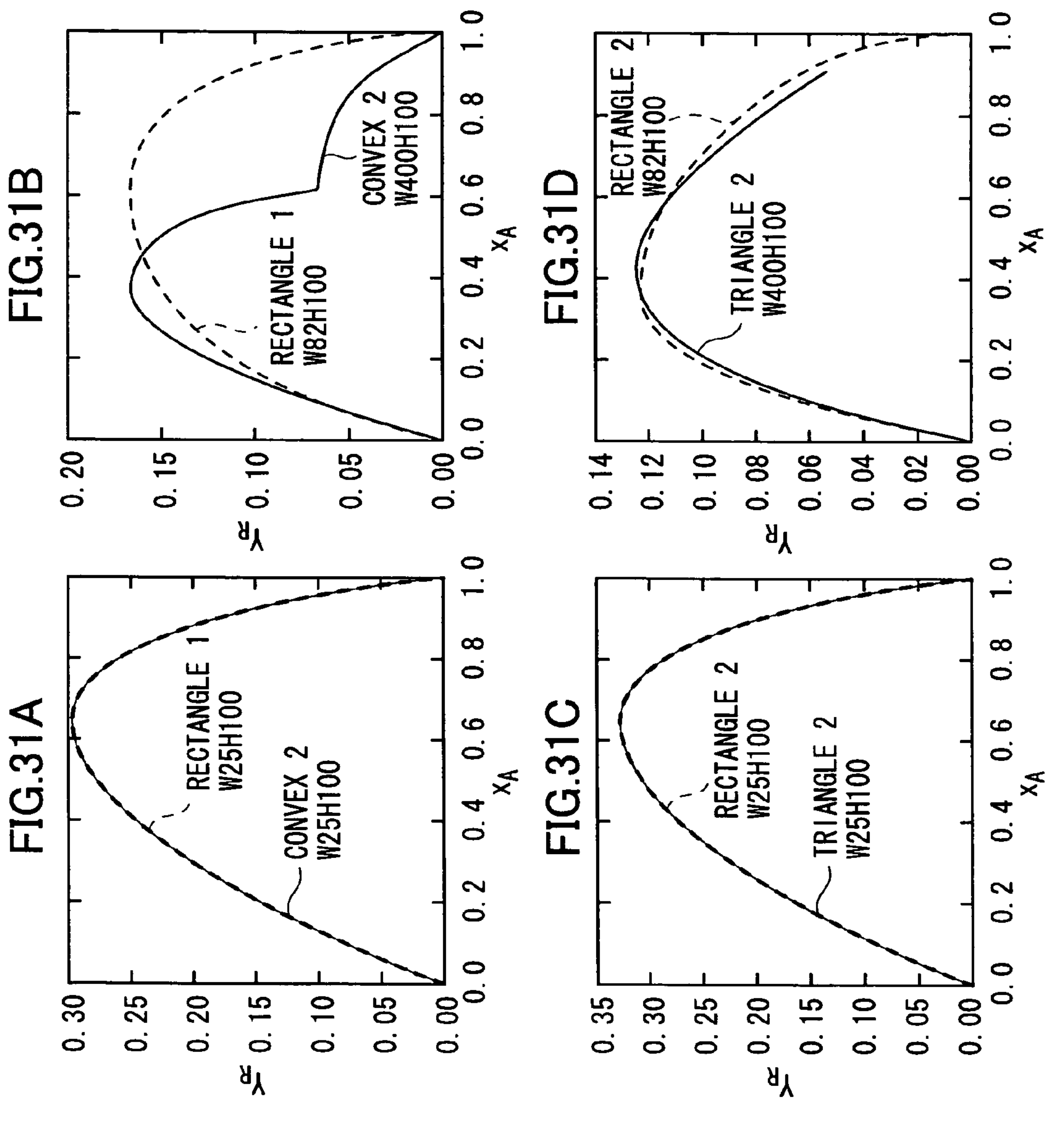
CORRESPONDENCE BETWEEN SEGMENT SHAPES AND RELATIONSHIP BETWEEN $Y_R$ AND $x_A$

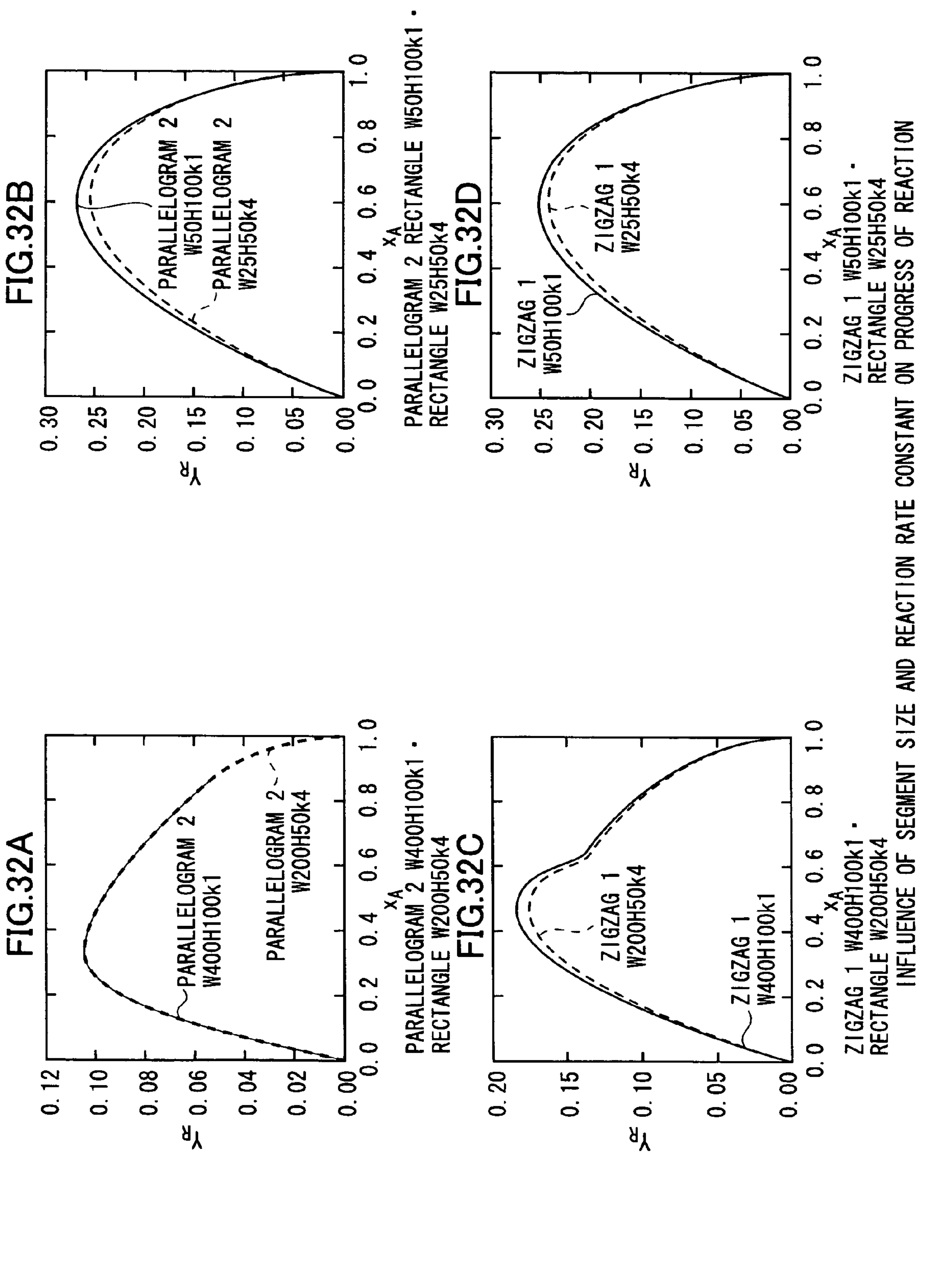
FIG.32A: PARALLELOGRAM 2 W400H100k1 · RECTANGLE W200H50k4
FIG.32B: PARALLELOGRAM 2 RECTANGLE W50H100k1 · RECTANGLE W25H50k4
FIG.32C: ZIGZAG 1 W400H100k1 · RECTANGLE W200H50k4
FIG.32D: ZIGZAG 1 W50H100k1 · RECTANGLE W25H50k4
INFLUENCE OF SEGMENT SIZE AND REACTION RATE CONSTANT ON PROGRESS OF REACTION

FIG.33

CHANGES IN $y_{R,max}$ IN MICROREACTIONCHANNEL DUE TO DISTRIBUTIONS OF SIZE OF RAW MATERIAL INTRODUCTION SEGMENTS

| RAW MATERIAL INTRODUCTION SEGMENT ARRANGEMENT | TOTAL NUMBER OF MESHES | RAW MATERIAL INTRODUCTION SEGMENT ARRANGEMENT | TOTAL NUMBER OF MESHES |
|---|---|---|---|
| ARRANGEMENT 1 | 8,000 | | |
| ARRANGEMENT 2 ($W_1$=25 μm, $W_2$=75 μm) | 12,000 | ARRANGEMENT 2 ($W_1$=10 μm, $W_2$=90 μm) | 16,000 |
| ARRANGEMENT 3 ($W_1$=25 μm, $W_2$=75 μm) | 12,000 | ARRANGEMENT 3 ($W_1$=10 μm, $W_2$=90 μm) | 12,000 |
| ARRANGEMENT 4 ($W_1$=25 μm, $W_2$=75 μm) | 10,000 | ARRANGEMENT 4 ($W_1$=10 μm, $W_2$=90 μm) | 12,000 |

FIG.34A

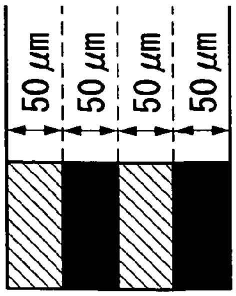

ARRANGEMENT 1:
ARRANGEMENT OF
SEGMENTS EQUAL
IN SIZE

FIG.34B

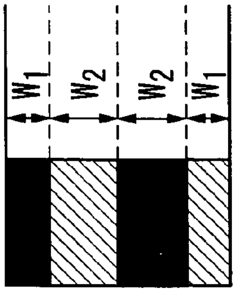

ARRANGEMENT 2:
ARRANGEMENT OF
LARGER SEGMENTS
AT CENTER

FIG.34C

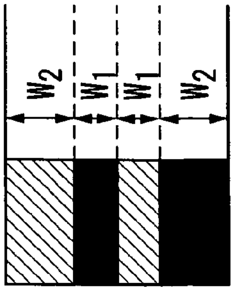

ARRANGEMENT 3:
ARRANGEMENT OF
SMALLER SEGMENTS
AT CENTER

FIG.34D

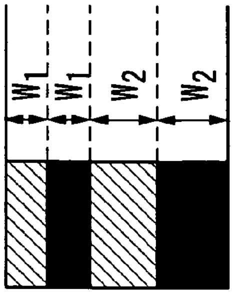

ARRANGEMENT 4:
ARRANGEMENT OF
SMALLER SEGMENTS IN
UPPER PORTION AND
LARGER SEGMENTS IN LOWER PORTION

COMBINATIONS OF THIN-LAYER SEGMENTS DIFFERING IN WIDTH
(ARRANGEMENTS 2 TO 4 HAVE COMBINATION OF THIN-LAYER
WIDTHS: $W_1=25\,\mu m$, $W_2=75\,\mu m$, OR $W_1 = W_1=10\,\mu m$, $W_2=90\,\mu m$)

CASE OF ARRANGEMENTS 2 TO 4 IN WHICH $W_1=25\,\mu m$, $W_2=75\,\mu m$

CASE OF ARRANGEMENTS 2 TO 4 IN WHICH $W_1=10\,\mu m$, $W_2=90\,\mu m$

RELATIONSHIP BETWEEN $Y_R$ AND $x_A$ IN THE CASE OF COMBINATION OF THIN-LAYER SEGMENTS DIFFERING IN WIDTH

FIG.36A Mixed
FIG.36B 25 μmX8
FIG.36C ARRANGEMENT 2
FIG.36D ARRANGEMENT 4
0  0.142
DIFFERENT DISTRIBUTIONS OF $y_R$ IN REACTOR DEPENDENT ON RAW MATERIAL SUPPLY METHOD

FIG.37

CHANGES IN $y_{R,max}$ IN MICROREACTIONCHANNEL DEPENDENT ON COMBINATION OF WIDTHS OF RAW MATERIAL INTRODUCTION SEGMENTS

| RAW MATERIAL INTRODUCTION SEGMENT ARRANGEMENT | $y_{R,max}$ | RAW MATERIAL INTRODUCTION SEGMENT ARRANGEMENT | $y_{R,max}$ |
|---|---|---|---|
| Mixed | 0.117 | | |
| WIDTH 25 μm × 8 | 0.137 | | |
| ARRANGEMENT 1 | 0.137 | | |
| ARRANGEMENT 2 ($W_1$=25 μm, $W_2$=75 μm) | 0.141 | ARRANGEMENT 2 ($W_1$=10 μm, $W_2$=90 μm) | 0.135 |
| ARRANGEMENT 3 ($W_1$=25 μm, $W_2$=75 μm) | 0.128 | ARRANGEMENT 3 ($W_1$=10 μm, $W_2$=90 μm) | 0.121 |
| ARRANGEMENT 4 ($W_1$=25 μm, $W_2$=75 μm) | 0.140 | ARRANGEMENT 4 ($W_1$=10 μm, $W_2$=90 μm) | 0.170 |

CASE OF ARRANGEMENTS 2 TO 4 IN WHICH $C_{jo,1}=0.5c_{jo}$, $C_{jo,2}=1.5C_{jo}$

CASE OF ARRANGEMENTS 2 TO 4 IN WHICH $C_{jo,1}=0.2c_{jo}$, $C_{jo,2}=1.8C_{jo}$

RELATIONSHIP BETWEEN $Y_R$ AND $x_A$ IN THE CASE OF COMBINATION OF THIN-LAYER SEGMENTS HAVING DIFFERENT RAW MATERIAL CONCENTRATIONS

FIG.40A ARRANGEMENT 1
FIG.40B ARRANGEMENT 2
FIG.40C ARRANGEMENT 3
FIG.40D ARRANGEMENT 4
DISTRIBUTIONS OF $Y_R$ IN REACTOR DEPENDENT ON RAW MATERIAL SUPPLY METHOD (ENTRANCE ON LEFT-HAND SIDE, $C_{J0,1}=0.5C_{J0}$, $C_{J0,2}=1.5C_{J0}$)

FIG.41

$y_{R,max}$ IN THE CASE OF COMBINATION OF THIN-LAYER SEGMENTS HAVING DIFFERENT RAW MATERIAL CONCENTRATIONS

| RAW MATERIAL INTRODUCTION SEGMENT ARRANGEMENT | $y_{R,max}$ | RAW MATERIAL INTRODUCTION SEGMENT ARRANGEMENT | $y_{R,max}$ |
|---|---|---|---|
| ARRANGEMENT 1 | 0.0579 | | |
| ARRANGEMENT 2 ($C_{jo,1}$=0.5$C_{jo}$, $C_{jo,2}$=1.5$C_{jo}$) | 0.0794 | ARRANGEMENT 2 ($C_{jo,1}$=0.2$C_{jo}$, $C_{jo,2}$=1.8$C_{jo}$) | 0.0899 |
| ARRANGEMENT 3 ($C_{jo,1}$=0.5$C_{jo}$, $C_{jo,2}$=1.5$C_{jo}$) | 0.0506 | ARRANGEMENT 3 ($C_{jo,1}$=0.2$C_{jo}$, $C_{jo,2}$=1.8$C_{jo}$) | 0.0442 |
| ARRANGEMENT 4 ($C_{jo,1}$=0.5$C_{jo}$, $C_{jo,2}$=1.5$C_{jo}$) | 0.0790 | ARRANGEMENT 4 ($C_{jo,1}$=0.2$C_{jo}$, $C_{jo,2}$=1.8$C_{jo}$) | 0.0910 |

METHOD OF MULTIPLE REACTION IN MICROREACTOR, AND MICROREACTOR

BACKGROUND OF THE INVENTION

1. Field of the Invention

The present invention relates to a method of multiple reaction in a microreactor and to the microreactor. More particularly, the present invention relates to a method of multiple reaction in a microreactor and the microreactor capable of obtaining a target product in a high yield by multiple reaction.

2. Description of the Related Art

In recent years, the development of a new manufacturing processing using a microspace called a microreactor has been pursued in the chemical industry or the pharmaceutical industry relating to manufacture of medicines, reagents, etc. A very small space (microreactionchannel) connecting to a plurality of microchannels (fluid introduction channels) is provided in a micromixer or a microreactor. A plurality of fluids (e.g., solutions in which raw materials to be reacted with each other are dissolved) are caused to flow together into the small space. Mixing or mixing and reaction between the fluids are caused thereby. Micromixers and microreactors are basically identical in structure. In some particular cases, however, those in which a plurality of fluids are mixed with each other are referred to as “micromixer”, while those in which mixing of a plurality of solutions is accompanied by chemical reaction between the solutions are referred to as “microreactor”. A microreactor in accordance with the present invention is assumed to comprise a micromixer.

Points of difference between reaction in the a microreactor as defined above and batch mixing or reaction using an agitation tank or the like will be described. That is, chemical reaction in liquid phase occurs ordinarily in such a manner that molecules meet each other at the interface between reaction solutions. In the case of chemical reaction in liquid phase in a very small space, therefore, the area of the interface is relatively increased to such an extent that the reaction efficiency is markedly high. Also, diffusion of molecules itself is such that the diffusion time is proportional to the square of the distance. This means that if the scale of the small space is smaller, mixing progresses faster due to diffusion of molecules to facilitate the reaction, even when the reaction solutions are not positively mixed with each other. Also, in the flow caused in the small space, laminar flows are dominant because of the small scale, and the solutions flow as laminar flows and react with each other by diffusing in a direction perpendicular to the laminar flows.

If such a microreactor is used, the reaction time, mixing temperature and reaction temperature in reaction of solutions can be controlled with improved accuracy in comparison with, for example, a conventional batch system using large-capacity tank or the like as a place for reaction.

Therefore, if multiple reaction is performed by using a microreactor, solutions flow continuously through the small space in the microreactor without staying substantially in the space and a non-uniform reaction product is not easily produced. In this case, a comparatively pure primary product can be extracted.

As such a microreactor, one disclosed in PCT International Publication WO No. 00/62913, one disclosed in Japanese National Publication of International Patent Application No. 2003-502144 and one disclosed in Japanese Patent Application Laid-open No. 2002-282682 are known. In each of these microreactors, two kinds of solutions are respectively passed through microchannels to be introduced into a small space as laminar flows in the form of extremely thin laminations, and are mixed and reacted with each other in the small space.

SUMMARY OF THE INVENTION

In multiple reaction using various kinds of reaction, there is a need to increase the yield of a primary product or to increase the yield of a secondary product while reducing the yield of the primary product according to the selection of a target product. However, sufficient techniques have not been established for control of the yield, i.e., the selectivity, of a target product in multiple reaction, particularly a primary product obtained as a reaction intermediate product.

In view of the above-described circumstances, an object of the present invention is to provide a method of multiple reaction in a microreactor capable of controlling the yield and selectivity of a target product in multiple reaction and therefore capable of improving the yield of a primary product obtained as a reaction intermediate product in particular, and a microreactor suitable for carrying out the method of multiple reaction.

The inventor of the present invention noticed, from a feature of a microreactor which resides in that a plurality of fluids flowing together into a microreactionchannel flow as laminar flows, the possibility of factors including the number, sectional shape, arrangement, aspect ratio, width (thickness in the direction of arrangement) and concentration of fluid segments in a diametral section of the microreactionchannel at the entrance side being freely controlled, and conceived control of the yield and selectivity of a target product in multiple reaction based on control of these factors.

The plurality of kinds of fluids are, for example, a fluid A and a fluid B if the number of kinds is two, and the fluid segments are fluid sections formed by dividing fluids A and B in the diametral section at the entrance side of the microreactionchannel and reconstructing fluids having the desired numbers of segment, arrangements, sectional shapes, widths and a concentration. “Diffusion distance between fluids” refers the distance between centroids of the shapes of the fluid segments in the diametral section of the microreactionchannel, and “specific surface area” refers to the ratio of the area of contact in the interface between an adjacent pair of fluid segments to a unit length of the fluid segments. These terms refer to the same concepts below.

To achieve the above-described object, according to a first aspect of the present invention, there is provided a method of multiple reaction in a microreactor in which a plurality of kinds of fluids are caused to flow together into a microreactionchannel, and are mixed with each other by molecular diffusion to perform multiple reaction while being caused to flow as laminar flows, comprising the step of: changing the diffusion distance and/or the specific surface area of the plurality of kinds of fluids flowing together into the microreactionchannel by dividing each of the plurality of kinds of fluids into a plurality of fluid segments in a diametral section of the microreactionchannel at the entrance side of the microreactionchannel, and by causing the fluid segments differing in kind to contact each other.

According to the first aspect, when multiple reaction between fluids A and B for example, expressed by reaction formulae:

$$A+B \rightarrow R \text{ (primary reaction)}$$

$$B+R \rightarrow S \text{ (secondary reaction)}$$

is performed, the yield of primary product R with respect the rate of reaction of fluid A is increased if the diffusion distance between fluid A and fluid B is reduced or if the specific surface area is increased. Conversely, if the specific surface area is reduced, the yield of primary product R with respect to the rate of reaction of fluid A becomes lower. That is, the yield of the secondary product is increased. Thus, it is possible to control the yield and selectivity of the target product in the multiple reaction by changing the diffusion distance and/or the specific surface area between the plurality of kinds of fluids flowing together into the microreactionchannel.

According to a second aspect of the present invention, each of the plurality of kinds of fluids is divided into a plurality of fluid segments in the diametral section of the microreactionchannel at the entrance side, thereby changing the number of fluid segments. If the number of fluid segments is thereby increased, the diffusion distance is reduced and the specific surface area is increased. Conversely, if the number of fluid segments is reduced, the diffusion distance is increased and the specific surface area is reduced.

According to a third aspect of the present invention, each of the plurality of kinds of fluids is divided into a plurality of fluid segments in the diametral section of the microreactionchannel at the entrance side, thereby changing the sectional shapes of the fluid segments in the diametral section of the microreactionchannel at the entrance side. The sectional shapes are selected from, for example, rectangular shapes such as squares and rectangles, parallelograms, triangles, and concentric circles. The effect of improving the yield of primary product R with respect to the rate of reaction of fluid A by selecting from such shapes increases in order of rectangles, parallelograms, triangles and concentric circles, because the diffusion distance is substantially reduced in correspondence with this order. In a case where a zigzag shape or a convex shape is selected as the sectional shape, the specific surface area is increased if the number of zigzag corners or projecting portions, i.e., the number of times a shape recurs, is increased, thereby increasing the yield of primary product R with respect to the rate of reaction of fluid A. Thus, the diffusion distance and the specific surface area can be changed by changing the shapes of the fluid segments in the diametral section of the microreactionchannel at the entrance side. In this way, the yield and selectivity of the target product in multiple reaction can be controlled. Both the number of fluid segments and the sectional shapes of the fluid segments may be changed.

According to a fourth aspect of the present invention, each of the plurality of kinds of fluids is divided into a plurality of fluid segments in the diametral section of the microreactionchannel at the entrance side, thereby changing the arrangement of the fluid segments differing in kind in the diametral section of the microreactionchannel at the entrance side. The method of arranging the fluid segments comprises a one-row arrangement in which, for example, fluid segments A obtained by dividing fluid and fluid segments B obtained by dividing fluid B are alternately arranged in one horizontal row, a two-row arrangement in which the one-row arrangements are formed one over another in two stages in such a manner that the kinds of fluid segments in each upper and lower adjacent pair of fluid segments are different from each other, and a checkered arrangement in which fluid segments A and fluid segments B are arranged in horizontal and vertical directions in the diametral section of the microreactionchannel at the entrance side so as to form a checkered pattern. The effect of improving the yield of primary product R with respect to the rate of reaction of fluid A increases in order of the one-row arrangement, the two-row arrangement and the checkered arrangement, because the specific surface area is substantially increased in correspondence with this order. The numbers, sectional shapes, arrangement factors of the fluid segments may be changed in combination.

According to a fifth aspect of the present invention, each of the plurality of kinds of fluids is divided into a plurality of fluid segments in the diametral section of the microreactionchannel at the entrance side, thereby forming a plurality of fluid segments having a rectangular sectional shape in the diametral section of the microreactionchannel at the entrance side, and changing the aspect ratio (the ratio of the depth to the width) of the fluid segments.

The aspect ratio is the ratio of the depth of a rectangular segment to the width of the segment (the thickness of the fluid segment in the arrangement direction. This aspect ratio may be changed by changing the depth of the fluid segment while constantly maintaining the width, or by changing the depth while constantly maintaining the area of the rectangle. In the case of changing the depth of the fluid segment while constantly maintaining the width, the yield of primary product R with respect to the rate of reaction of fluid A is reduced if the aspect ratio is lower, that is, the depth is smaller. In other words, the yield of primary product R with respect to the rate of reaction of fluid A is increased if the aspect ratio is higher, that is, the depth is larger. This may be because a rate distribution with a large gradient is also developed in the depth direction with the rate distribution in the widthwise direction due to laminar flows, as the yield and selectivity of the parallel reaction intermediate product become, step by step, lower under laminar flows than under a plug-flow. In the case of changing the depth while constantly maintaining the area of the rectangle, the yield of primary product R with respect to the rate of reaction of fluid A is increased if the aspect ratio is higher, that is, the width is smaller. This is because the diffusion distance becomes shorter if the aspect ratio is increased. In either case, it is possible to change the yield and selectivity of the target product in multiple reaction by changing the aspect ratio. The numbers, sectional shapes, arrangement, and aspect ratio factors of the fluid segments may be changed in combination.

In the second to fifth aspects, the microreactor is arranged so that each of the numbers, sectional shapes, arrangements, and aspect ratios of the fluid segments in the diametral section of the microreactionchannel at the entrance side can be changed. However, a raw material concentration in fluid segments identical in kind to each other may be changed as well as these factors.

To achieve the above-described object, according to a sixth aspect of the present invention, there is provided a method of multiple reaction in a microreactor in which a plurality of kinds of fluids are caused to flow together into one microreactionchannel via respective fluid introduction channels, and are mixed with each other by molecular diffusion to perform multiple reaction while being caused to flow as laminar flows, comprising the steps of: dividing each of the plurality of kinds of fluids into a plurality of fluid segments having a rectangular sectional shape in a diametral section of the microreactionchannel at the entrance side; arranging the fluid segments so that the fluid segments differing in kind contact each other; and changing the width of the arranged fluid segments in the direction of arrangement.

This method has been achieved based on the finding that the yield of primary product R with respect to the rate of reaction of fluid A can be changed according to the way of arranging rectangular fluid segments differing in width. For example, arrangements using combinations of fluid segments A and fluid segments B having two segment widths include an equal-width arrangement in which fluid segments A and B made equal in width to each other are alternately arranged, a large-central-width arrangement in which fluid segments A and B of a smaller width are placed at opposite positions in the arrangement direction while fluid segments A and B of a larger width are placed at central positions, a small-central-width arrangement in which fluid segments A and B of a larger width are placed at opposite positions in the arrangement direction while fluid segments A and B of a smaller width are placed at central positions, and a one-sided arrangement in which fluid segments A and B of a smaller width are placed at positions closer to one end in the arrangement direction while fluid segments A and B of a larger width are placed at positions closer to the other end. By selecting from arrangements using combinations of such different segment widths, the yield of primary product R with respect to the rate of reaction of fluid A can be changed. Thus, the yield and selectivity of the target product in multiple reaction can be controlled.

To achieve the above-described object, according to a seventh aspect of the present invention, there is provided a method of multiple reaction in a microreactor in which a plurality of kinds of fluids are caused to flow together into one microreactionchannel via respective fluid introduction channels, and are mixed with each other by molecular diffusion to perform multiple reaction while being caused to flow as laminar flows, comprising the steps of: dividing each of the plurality of kinds of fluids into a plurality of fluid segments having a rectangular sectional shape in a diametral section of the microreactionchannel at the entrance side of the microreactionchannel; arranging the fluid segments so that the fluid segments differing in kind contact each other with a certain width; and changing a concentration between the fluid segments identical in kind to each other in the arranged fluid segments.

This method has been achieved based on the finding that the yield of primary product R with respect to the rate of reaction of fluid A can be changed in such a manner that rectangular fluid segments are arranged while being made equal in width to each other, and a concentration is changed among fluid segments identical in kind to each other.

For example, arrangements using combinations of concentrations in fluid segments A and fluid segments B include an equal-concentration arrangement in which fluid segments A having equal concentrations and fluid segments B having equal concentrations (which may be different from the concentrations in the fluid segments A) are alternately arranged, a center high-concentration arrangement in which fluid segments A and B having higher concentrations are placed at central positions in the arrangement direction, a center low-concentration arrangement in which fluid segments A and B having lower concentrations are placed at central positions in the arrangement direction, and a one-sided-concentration arrangement in which fluid segments A and B having higher concentrations are placed at positions closer to one end in the arrangement direction while fluid segments A and B having lower concentrations are placed at positions closer to the other end. By selecting from arrangements using such combinations of segments having different concentrations, the yield of primary product R with respect to the rate of reaction of fluid A can be changed. Thus, the yield and selectivity of the target product in multiple reaction can be controlled.

In the sixth aspect, arrangements using combinations of different segment widths are provided. In the seventh aspect, arrangements using combinations of segments having different concentrations are provided. However, arrangements using both a combination of different segment widths and a combination of segments having different concentrations may be provided.

To achieve the above-described object, according to an eighth aspect of the present invention, there is provided a microreactor in which a plurality of kinds of fluids are caused to flow together into a microreactionchannel, and are mixed with each other by molecular diffusion to perform multiple reaction while being caused to flow as laminar flows, comprising: a fluid introduction portion having a multiplicity of fine introduction openings divided in a grid pattern in a diametral section of the microreactionchannel at the entrance side, a multiplicity of fluid introduction channels communicating with the introduction openings being stacked in the fluid introduction portion; and a distribution device which forms a plurality of fluid segments into which the plurality of kinds of fluids are divided in the diametral section of the microreactionchannel at the entrance side by distributing the fluids to the multiplicity of fluid introduction channels and introducing the fluids from the introduction openings into the microreactionchannel.

In the eighth aspect of the present invention, a microreactor is arranged which is capable of freely controlling factors including the numbers, sectional shapes, arrangements, aspect ratios, widths (thickness in the direction of arrangement) and concentrations of fluid segments in a diametral section of a microreactionchannel at the entrance, and a multiplicity of fluid instruction channels divided into fine introduction openings in a grid pattern are formed in the diametral section of the microreactionchannel at the entrance side. A plurality of kinds of fluids are distributed to the multiplicity of fluid introduction channels by the distribution device to form a plurality of fluid segments of each kind of fluid in the diametral section of the microreactionchannel at the entrance side. That is, according to the present invention, the configurations of groups of introduction openings in the grid pattern formed in the diametral section of the microreactionchannel at the entrance side are formed in correspondence with the shapes of rectangles, parallelograms, triangles or the like, thus forming the above-described sectional shapes of the fluid segments corresponding to the shapes of rectangles, parallelograms, triangles or the like. If the sectional shapes are formed as concentric circles, it is preferred that the diametral section of the microreactionchannel be circular. The one-row arrangement, two-row arrangement or checkered arrangement described above can be formed according to the same concept. It is also possible to change the aspect ratio, the width and the number of fluid segments. In this case, the desired shape can be formed with accuracy if the size of one introduction opening is smaller. However, the diameter of one introduction opening is preferably in the range from several microns to 100 μm in terms of equivalent diameter since it is preferred that the microreactionchannel be a fine channel of an equivalent diameter of 2000 μm or less.

According to a ninth aspect, the number of the fluid segments is changed by the distribution device distributing the plurality of kinds of fluids to the multiplicity of fluid introduction channels. According to a tenth aspect, the sectional shape is changed. According to an eleventh aspect, the arrangement is changed. According to a twelfth aspect, the aspect ratio of the rectangular shape is changed.

According to a thirteenth aspect, a concentration control device which changes a raw-material concentration between fluid segments identical in kind to each other is provided, thereby enabling selection from combinations of segments having different concentrations.

According to a fourteenth aspect, a preferable equivalent diameter of the microreactionchannel allowing the plurality of fluids flowing together into the microreactionchannel to flow as laminar flows is defined. The equivalent diameter is preferably 2000 μm or less, more preferably 1000 μm or less, depending on the viscosities of the fluids. If the microreactionchannel is defined in terms of Reynolds number, Re 200 or less is preferred.

Thus, the microreactor of the present invention is capable of freely changing factors including the numbers, sectional shapes, arrangements, aspect ratios, widths and concentrations of fluid segments in the diametral section of the microreactionchannel and is, therefore, extremely useful as a microreactor for multiple reaction. However, the microreactor of the present invention can be applied to various reaction systems without being limited to multiple reaction.

As described above, the method of multiple reaction in a microreactor and the microreactor in accordance with the present invention are capable of controlling the yield and selectivity of a target product in multiple reaction and therefore increase, in particular, the yield of a primary product, which is an intermediate reaction product.

BRIEF DESCRIPTION OF THE DRAWINGS

FIGS. 11A to 11C are diagrams showing different molar fraction distributions of a target product dependent on the number of fluid segments;

FIG. 12 is a diagram showing changes in maximum yield dependent on the number of fluid segments;

FIGS. 13A to 13E are diagrams showing various methods of arranging fluid segments;

FIG. 15 is a diagram sowing a correspondence between a one-horizontal-row periodic arrangement and a vertical periodic arrangement;

FIG. 20 is a diagram showing changes in maximum flow rate dependent on the aspect ratio of fluid segments;

FIG. 22 is a diagram showing a correspondence between the specific surface areas of rectangular fluid segments and corresponding square fluid segments;

FIGS. 24A to 24F are diagrams showing fluid segments having sectional shapes corresponding to squares, parallelograms and triangles;

FIGS. 25G to 25K are diagrams showing fluid segments having zigzag and convex sectional shapes;

FIG. 26L is a diagram showing fluid segments in concentric-circle sectional shapes;

FIG. 27 is a diagram showing radii of fluid segments having concentric-circle sectional shapes;

FIG. 28 is a diagram showing a method of discretization in a simulation on each sectional shape;

FIG. 30 is a diagram showing a size correspondence between fluid segments having maximum-yield-matching sectional shapes and rectangular fluid segments;

FIGS. 31A to 31D are diagrams showing $Y_R$–$x_A$ correspondence between the sectional shapes;

FIGS. 32A to 32D are diagrams for explaining the influence of the size of fluid segments and the reaction rate constant on progress of reaction;

FIG. 33 is a diagram showing changes in maximum yield due to fluid segment size distributions;

FIGS. 34A to 34D are diagrams showing methods of arranging fluid segments differing in width;

FIGS. 36A to 36D is a diagram showing different yield distributions in the microreactionchannel dependent on the different arrangements of fluid segments differing in width;

FIG. 37 is a diagram showing changes in maximum yield due to the different arrangements of fluid segments differing in width;

FIGS. 40A to 40D are diagrams showing changes in maximum yield due to the different arrangements of fluid segments differing in raw material concentration; and FIG. 41 is a diagram showing changes in maximum yield due to the different arrangements of fluid segments differing in concentration.

DETAILED DESCRIPTION OF THE PREFERRED EMBODIMENTS

A preferred embodiment of the method and microreactor for multiple reaction in accordance with the present invention will be described below with reference to the accompanying drawings.

Figure 1:
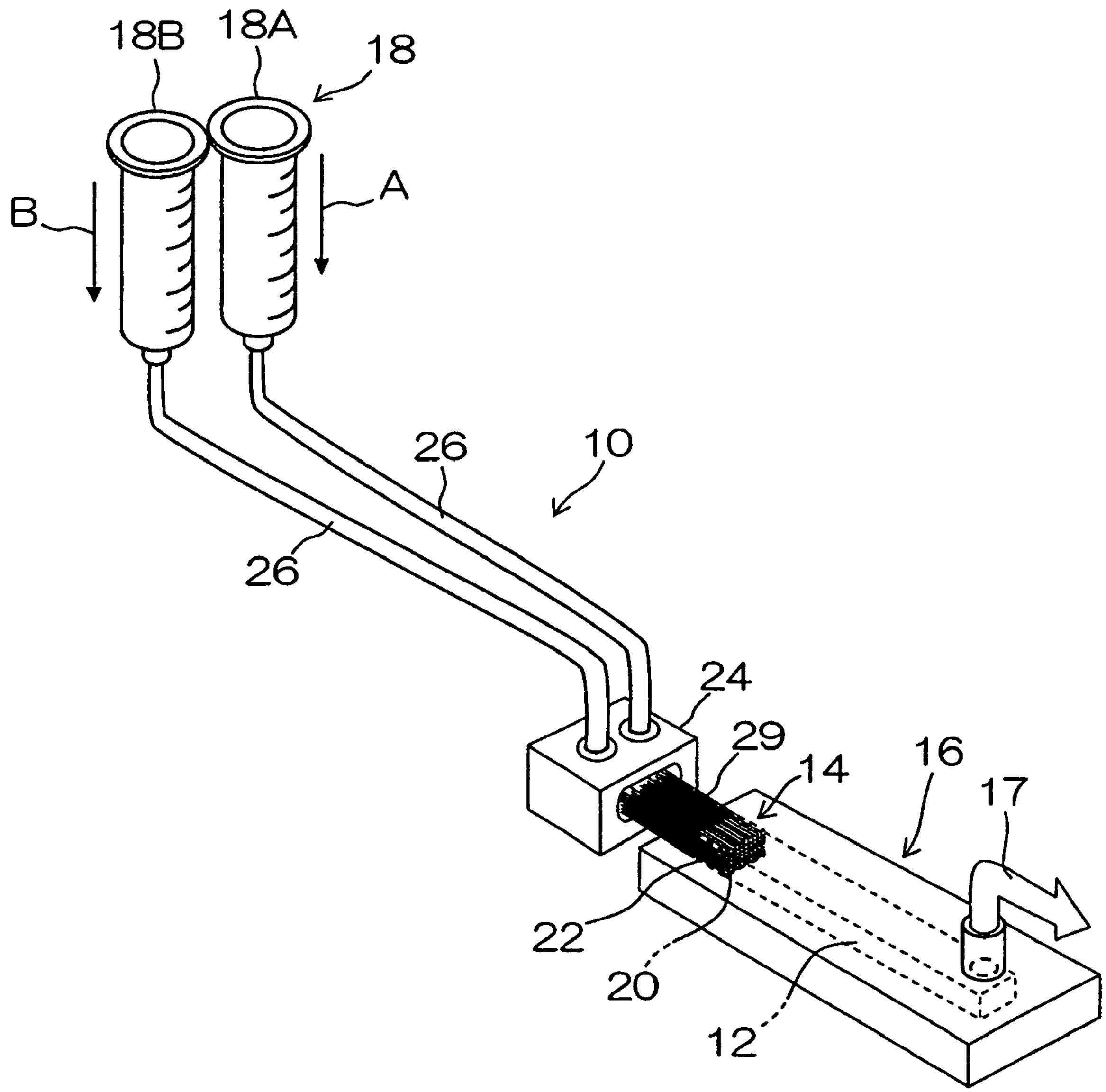
FIG. 1 is a diagram schematically showing the entire construction of a microreactor of the present invention.
Figure 2:
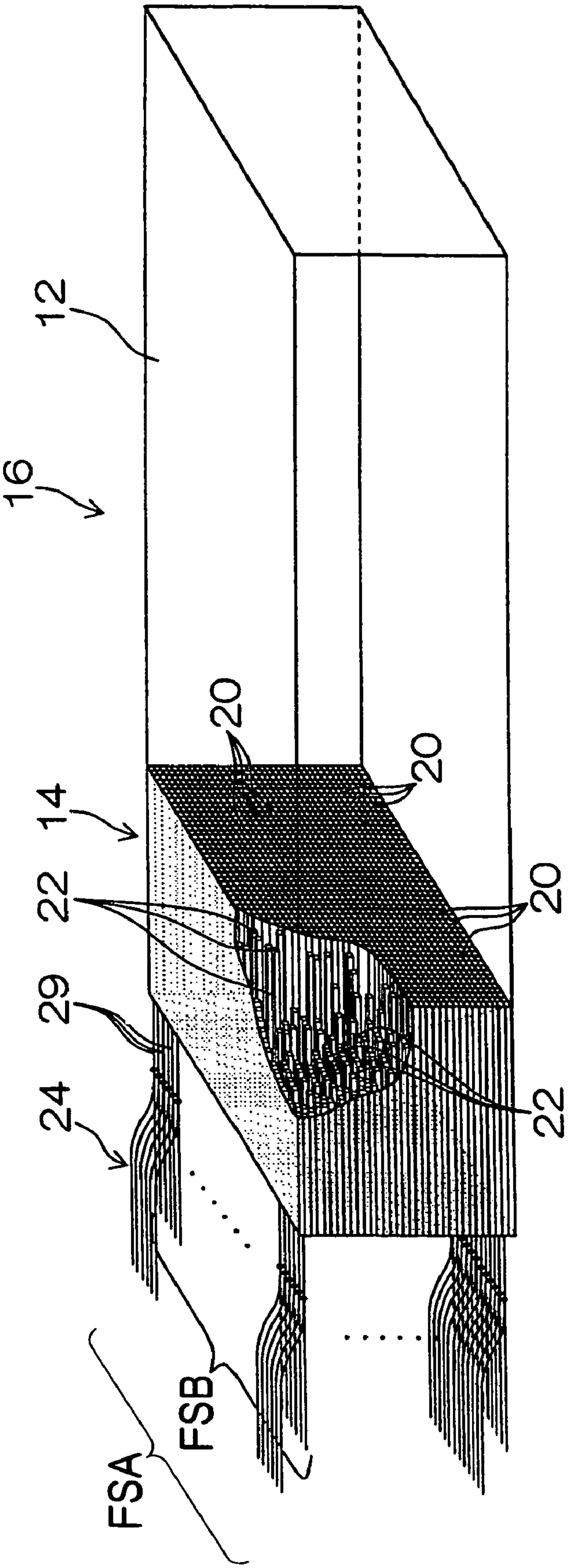
FIG. 2 is a diagram schematically showing the structure of a fluid introduction portion of a microreactor main unit.

FIG. 1 is a diagram showing the entire construction of a microreactor 10 of the present invention. FIG. 2 is a schematic diagram for explaining an fluid introduction portion 14 for introducing fluids into a microreactionchannel 12. FIGS. 3 to 6 are diagrams showing examples of cases in which the sectional shapes, arrangements, aspect ratios and/or widths of fluid segments in a diametral section of the microreactionchannel 12 are changed. This embodiment will be described with respect to reaction between two kinds of fluids A and B in the microreactionchannel 12 by way of example, but three or more kinds of fluids may be used.

The microreactor 10 is constituted mainly by a microreactor main unit 16 and a fluid supply device 18 for supplying fluids A and B to the microreactor main unit 16. Preferably, the fluid supply device 18 is capable of continuously supplying the microreactor main unit 16 with small amounts of fluids A and B at a constant pressure. Syringe pumps 18A will be described as the fluid supply device 18 by way of example. The device for supplying fluids A and B to the microreactor main unit 16 is not limited to syringe pumps 18A and 18B. Any device suffices if it is capable of supplying small amounts of fluids A and B at a constant pressure.

The microreactor main unit 16 is constituted mainly by the microreactionchannel 12 in which a plurality of fluids A and B are passed as laminar flows and are mixed with each other by molecular diffusion to react with each other, and a fluid introduction portion 14 for introducing fluids A and B into the microreactionchannel 12.

The microreactionchannel 12 is a small space in the form of a channel generally rectangular as seen in a diametral section. Since there is a need to cause fluid segments A and B to pass as laminar flows in the microreactionchannel 12, the equivalent diameter of the microreactionchannel 12 is preferably 2000 μm or less, more preferably 1000 μm or less, and most preferably 500 μm or less, depending on the viscosity of fluids A and B and other factors. The Reynolds number of the fluids flowing in the microreactionchannel 12 is preferably 200 or less. The shape of the diametral section of the microreactionchannel 12 at the entrance side is not limited to the rectangular shape. The diametral shape may alternatively be circular for example.

As shown in FIG. 2, the fluid introduction portion 14 is constituted by a multiplicity of fluid introduction channels 22 which has a multiplicity of fine introduction openings 20 finely divided in a grid pattern in the diametral section at the entrance side of the microreactionchannel 12, and which lead fluids A and B to the introduction openings 20, and a distribution device 24 (see FIG. 1) which forms from fluids A and B a plurality of fluid segments A and B in the diametral section at the entrance side of the microreactionchannel 12 by distributing fluids A and B to the multiplicity of fluid introduction channels 22. The fluid segments are fluid sections formed by dividing fluids A and B in the diametral section at the entrance side of the microreactionchannel 12 and reconstructing fluids, for example, of the desired numbers of segments, arrangements, sectional shapes, widths and concentrations.

The distribution device 24 is connected to the syringe pumps 18A and 18B by tubes 26, and communicates with each of the multiplicity of fluid introduction channels 22 constituting the fluid introduction portion 14 via fine pipes 29. The distribution device 24 is constructed so as to be capable of selectively introducing fluids A and B through each of the multiplicity of fluid introduction channels 22. Fluids A and B are thereby divided into a plurality of fluid segments A and B in the diametral section at the entrance side of the microreactionchannel 12 when caused to flow together from the fluid introduction portion 14 into the microreactionchannel 12. These fluid segments A and B are made to pass as laminar flows and are mixed by molecular diffusion to effect multiple reaction. Reaction products generated by the multiple reaction are discharged through a discharge port 17. Association between fluids A and B and the fluid introduction channels 22 in distribution of fluids A and B to the fluid introduction channels 22 by the distribution device 24 is determined by selecting, for example, settings of the numbers of segments, sectional shapes, arrangements, aspect ratios, widths and concentrations of fluid segments A and B in the diametral section at the entrance side of the microreactionchannel 12. That is, since the multiplicity of fluid segments A and B flowing together into the microreactionchannel 12 flow as laminar flows according to the characteristics of the microreactionchannel 12, factors including the numbers of segments, sectional shapes, arrangements, aspect ratios, widths and concentrations of the fluid segments in the diametral section at the entrance side of the microreactionchannel 12 can be freely controlled.

Figure 3:
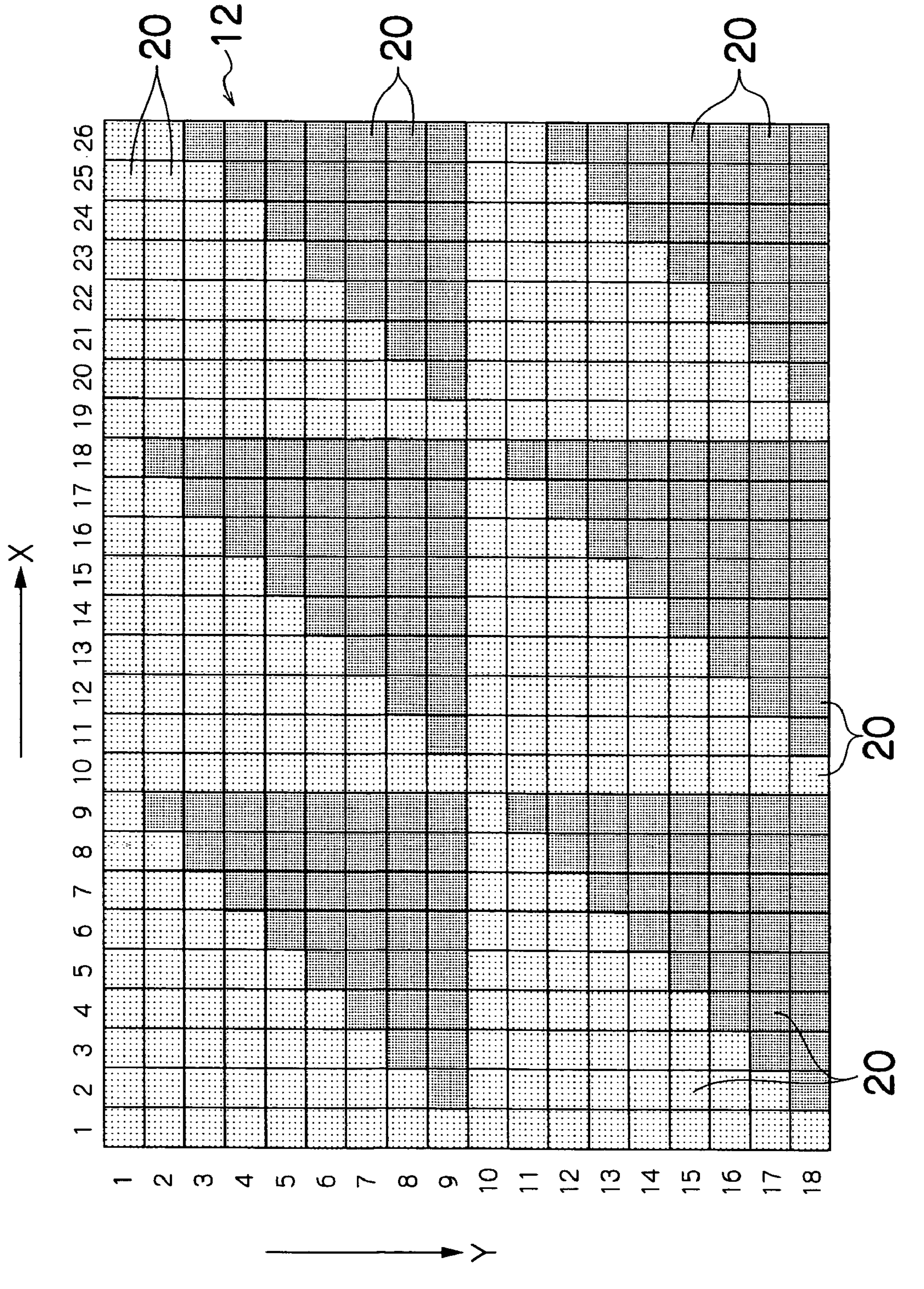
FIG. 3 is a diagram showing the arrangement of fluid segments having triangular sectional shapes.

For example, the fluid introduction portion 14 may be constituted by a multiplicity of fluid introduction channels 22 divided in such a manner that, as shown in FIG. 3, the number of introduction openings 20 arranged in the horizontal direction (X-axis direction) is 26 while the number of introduction openings 20 arranged in the vertical direction (Y-axis direction) is 18, that is, a total of 468 introduction openings 20 are formed. If the microreactor 10 having the fluid introduction portion 14 constructed in this way is used, fluids A and B can be divided into 468 fluid segments at the maximum (234 fluid segments A and 234 fluid segments B). Accordingly, if fluid segments A and B should have triangular sectional shapes in the diametral section at the entrance side of the microreactionchannel 12, fluids A and B may be introduced respectively from the introduction openings 20 indicated in a dark color in FIG. 3 and the other introduction openings 20 indicated in a light color in FIG. 3 into the microreactionchannel 12. The sectional shapes of fluid segments A and B in the diametral section at the entrance side of the microreactionchannel 12 are thereby made triangular. Fluid segments A and B of other various sectional shapes (not shown), e.g., rectangular shapes such as the shape of a square and the shape of an oblong, parallelogrammatic shapes, triangular shapes, concentric circular shapes, zigzag shapes, and convex shapes can be formed in a similar manner. If concentric circular shapes are formed, it is preferred that the diametral section at the entrance side of the microreactionchannel 12 be not rectangular but circular. In changing the sectional shapes of the fluid segments A and B as described above, the desired shape can be formed with higher accuracy if the size of each introduction opening 20 is smaller. However, since it is preferred that the microreactionchannel 12 be a fine channel such that the diameter at the entrance side of the microreactionchannel 12 in terms of equivalent diameter is 2000 μm or less, it is preferred that the diameter of each introduction opening 20 be within the range from several microns to several hundred microns in terms of equivalent diameter.

Figure 4:
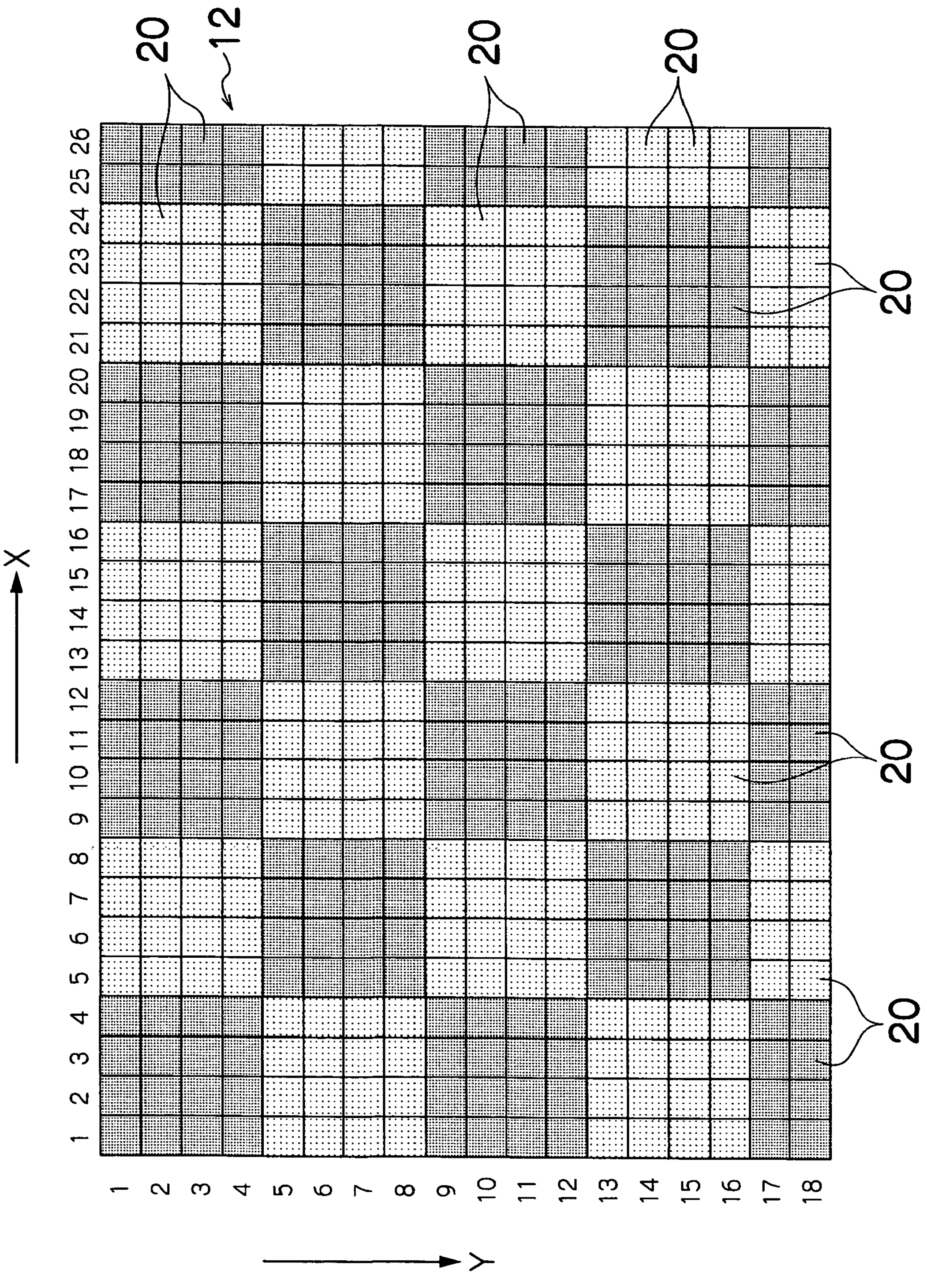
FIG. 4 is a diagram showing a method of arranging fluid segments in a checkered pattern.

If fluid segments A and B should be arranged in a checkered pattern in the diametral section at the entrance side of the microreactionchannel 12 as shown in FIG. 4, fluids A and B may be introduced respectively from the introduction openings 20 indicated in a dark color in FIG. 4 and the other introduction openings 20 indicated in a light color in FIG. 4 into the microreactionchannel 12. Fluid segments A and B are thereby arranged in a checkered pattern in the diametral section at the entrance side of the microreactionchannel 12. Fluid segments A and B can be arranged in other various patterns (not shown) in a similar manner. For example, fluid segments A and B can be formed in a one-row pattern in which fluid segments A and B are alternately placed in a row in the horizontal direction, a two-row pattern in which the one-row patterns are formed one over another in two stages in such a manner that the kinds of fluid segments in each upper and lower adjacent pair of fluid segments A and B are different from each other, and in other patterns.

Figure 5A:
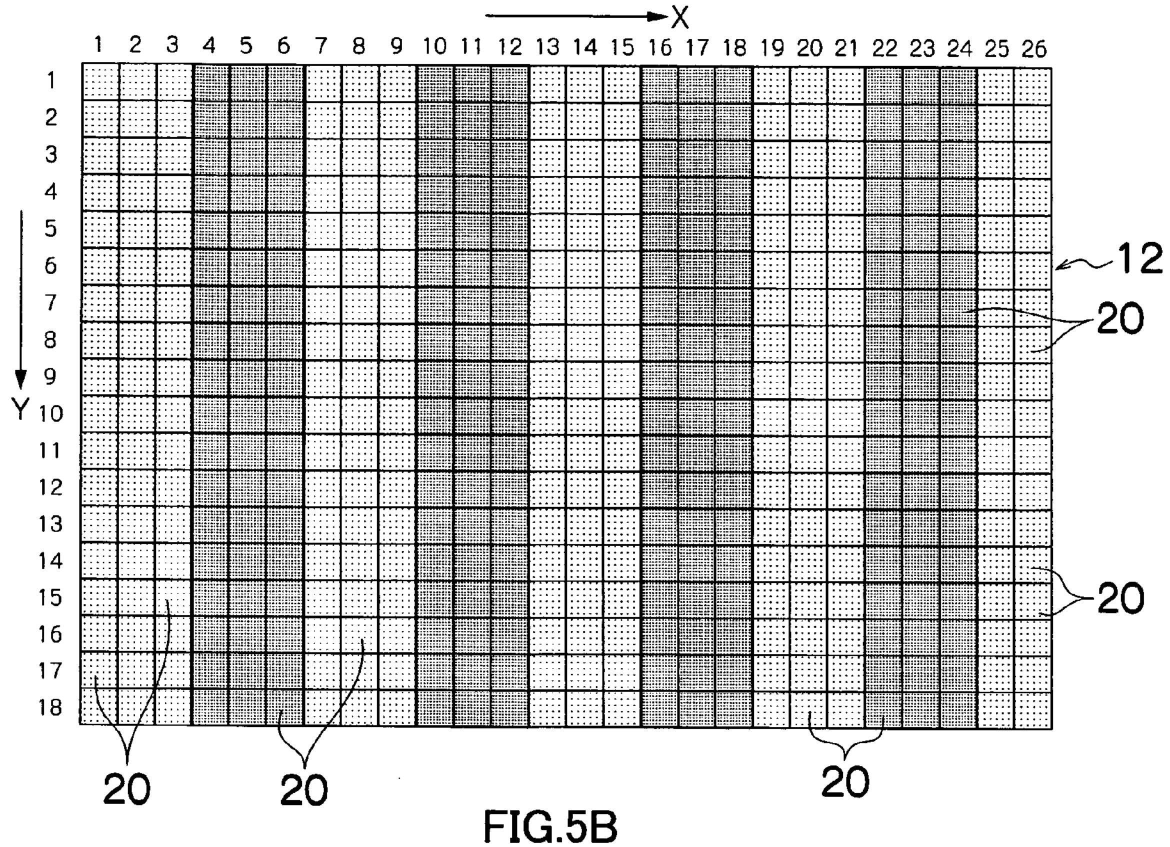
FIGS. 5A and 5B are diagrams showing a case of changing the aspect ratio of fluid segments.
Figure 5B:
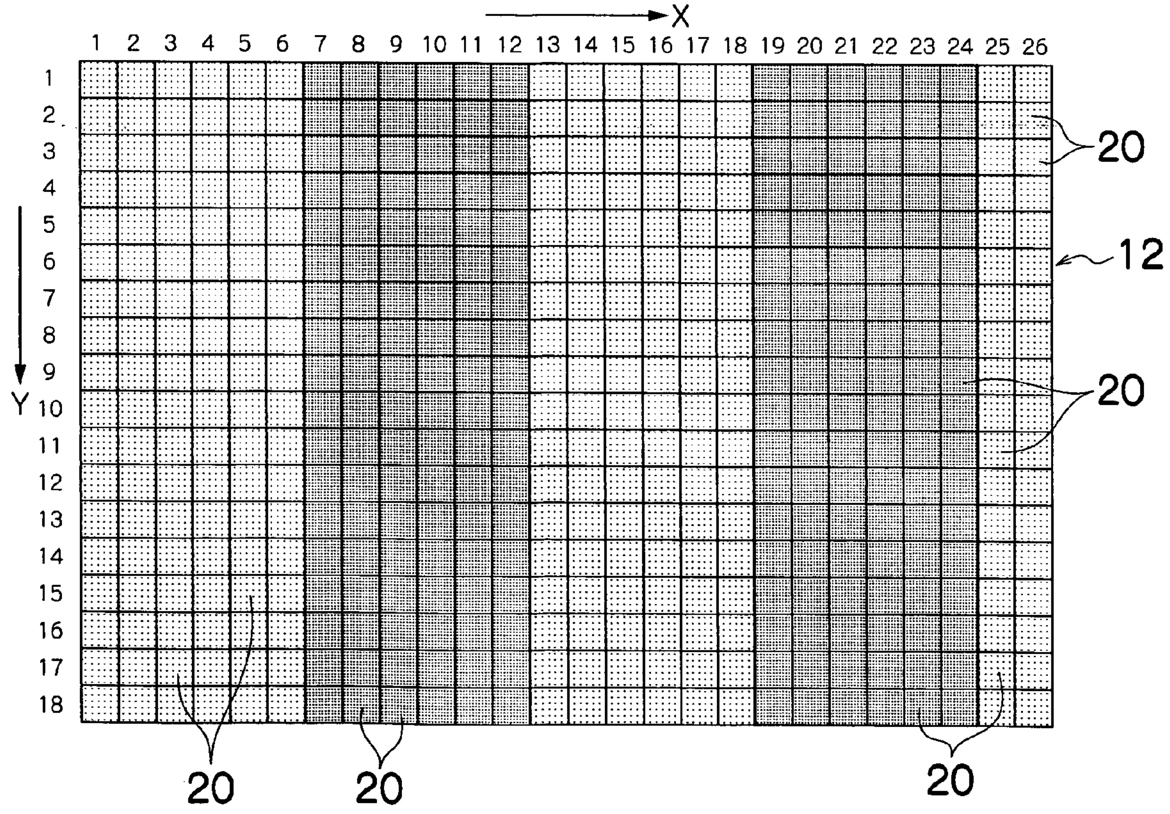

If the aspect ratios of rectangular sectional shapes of fluid segments A and B alternately arranged should be changed as shown in FIGS. 5A and 5B, fluids A and B may be introduced respectively from the introduction openings 20 indicated in a dark color in FIGS. 5A and 5B and the other introduction openings 20 indicated in a light color in FIGS. 5A and 5B into the microreactionchannel 12. In this way, fluid segments A and B having a higher aspect ratio as shown in FIG. 5A can be replaced with fluid segments A and B having a lower aspect ratio as shown in FIG. 5B. The aspect ratio is the ratio or the depth of rectangular fluid segments A or B to the width of rectangular fluid segments A or B.

Figure 6:
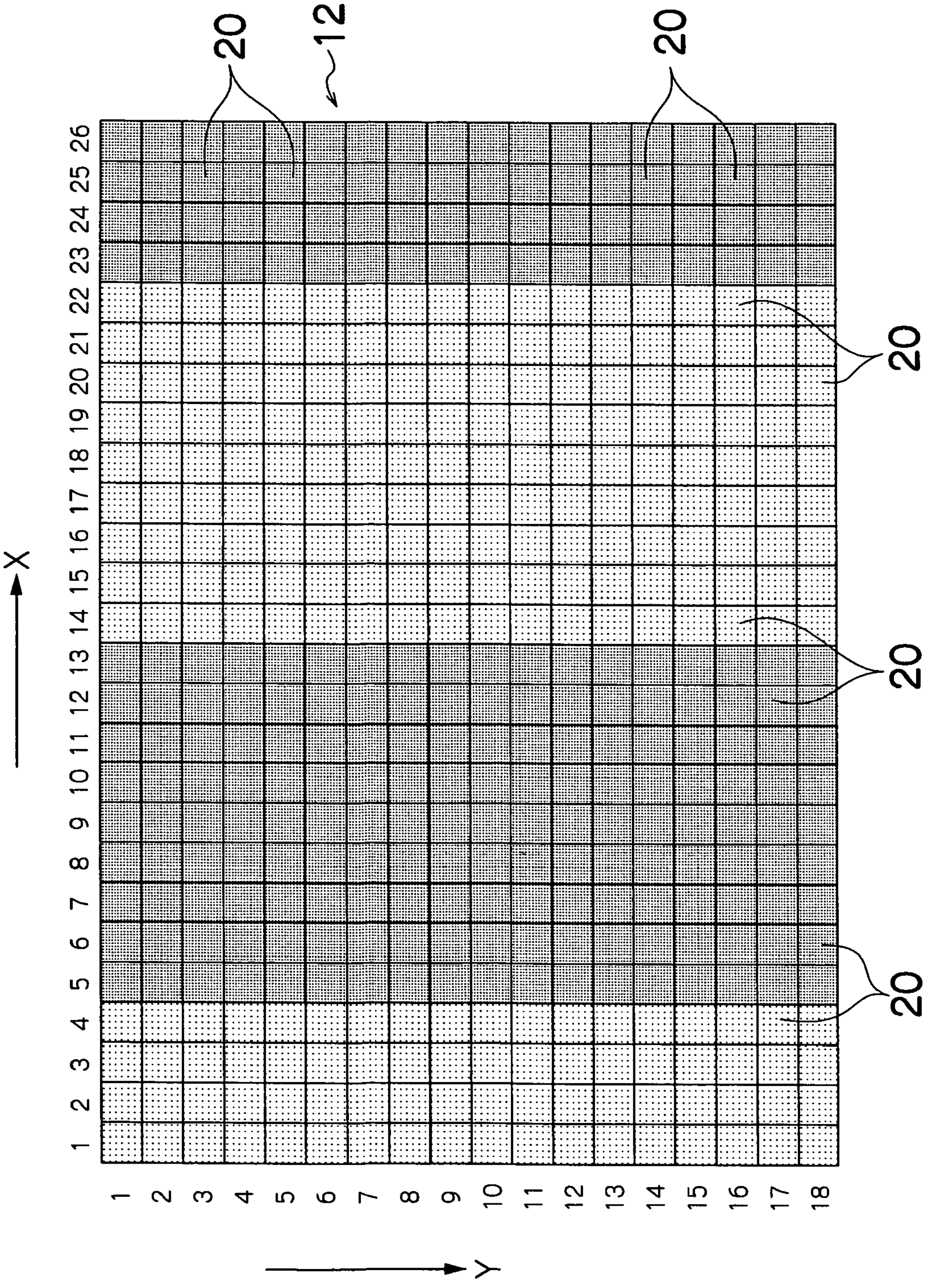
FIG. 6 is a diagram showing a case of changing the width of fluid segments.

If the widths of fluid segments A and B (the thicknesses of fluid segments A and B in the arrangement direction) should be changed to obtain, for example, a large-central-width arrangement, such as shown in FIG. 6, in which fluid segments A and B of a smaller width are placed at opposite positions in the arrangement direction while fluid segments A and B of a larger width are placed at central positions, fluids A and B may be introduced respectively from the introduction openings 20 indicated in a dark color in FIGS. 6 and the other introduction openings 20 indicated in a light color in FIG. 6 into the microreactionchannel 12. Other arrangements (not shown) in which fluid segments A and B are varied in width can also be provided. An equal-width arrangement in which fluid segments A and B equal in width to each other are alternately arranged, a small-central-width arrangement in which fluid segments A and B of a larger width are placed at opposite positions in the arrangement direction while fluid segments A and B of a smaller width are placed at central positions, a one-sided arrangement in which fluid segments A and B of a smaller width are placed at positions closer to one end in the arrangement direction while fluid segments A and B of a larger width are placed at positions closer to the other end, and other arrangements can be formed.

Figure 7:
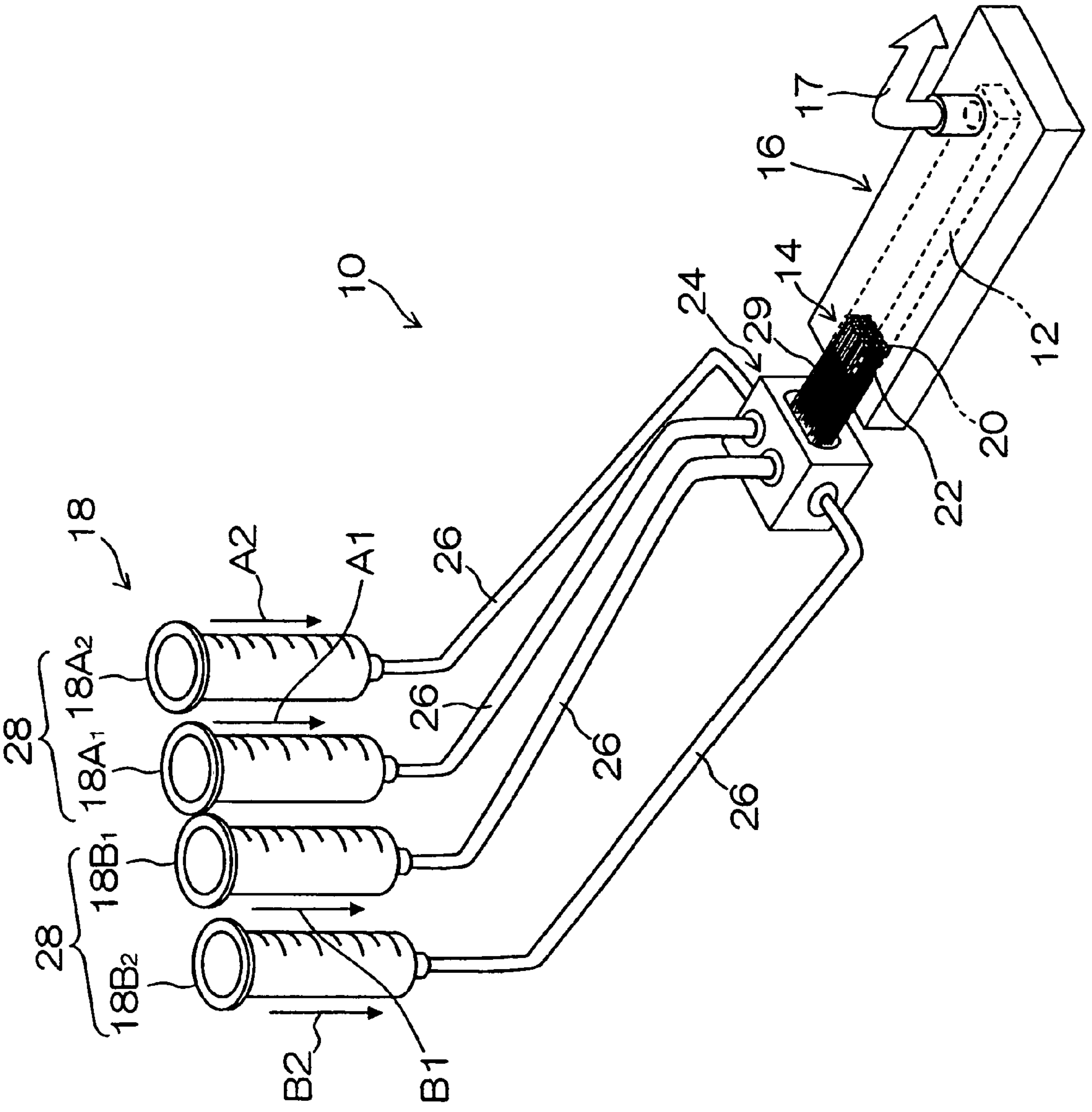
FIG. 7 is a diagram showing the entire construction of a microreactor having a concentration adjustment device.

FIG. 7 shows a case where concentration adjustment devices 28 capable of changing concentrations in fluids A and B are provided in the microreactor 10 shown in FIG. 1. In the example of microreactor shown in FIG. 7, two concentrations (A1, A2) can be adjusted with respect to fluid A and two concentrations (B1, B2) can also be adjusted with respect to fluid B.

As shown in FIG. 7, two syringe pumps $\mathbf{18}A_1$, and $\mathbf{18}A_2$ for supplying fluids A differing in concentration and two syringe pumps $\mathbf{18}B_1$ and $\mathbf{18}B_2$ for supplying fluids B differing in concentration are provided and each of four syringe pumps $\mathbf{18}A_1$, $\mathbf{18}A_2$, $\mathbf{18}B_1$, and $\mathbf{18}B_2$ is connected to the distribution device 24 by a tube 26. The distribution device 24 is constructed so as to be capable of changing fluid introduction channels 22 with respect to the concentrations (A1, A2) of one fluid A or the concentrations (B1, B2) of fluid B as well as changing fluid introduction channels 22 with respect to fluids A and B.

The microreactor 10 constructed as described above is capable of controlling the numbers of segments, sectional shapes, arrangements and aspect ratios of fluid segments A and B in the diametral section at the entrance side of the microreactionchannel 12, and freely setting the diffusion distance and specific surface area of fluids A and B. Further, the microreactor 10 is capable of controlling the arrangements of fluid segments A and B differing in width and concentration and freely setting even the concentration distribution in the widthwise direction of the microreactionchannel 12.

The microreactor 10 of the present invention is suitable for carrying out multiple reaction of fluids A and B because it is capable of controlling the yield and selectivity of a target product of the multiple reaction by changing the diffusion distance and specific surface area between the plurality of kinds of fluids flowing together into the microreactionchannel 12 and by changing the concentration distribution in the widthwise direction of the microreactionchannel 12. The microreactor 10 of the present invention can be applied not only to carrying out of multiple reaction but also to other systems which need changing the diffusion distance and specific surface area between fluids and changing the concentration distribution in the widthwise direction of the microreactionchannel 12.

Also, the microreactor 10 of the present invention can be effectively used as a microreactor for studying optimum conditions to find optimum conditions for various reaction systems. If an optimum condition for a reaction system is found with the microreactor 10 of the present invention by changing factors including the numbers of segments, sectional shapes, arrangements, aspect ratios, widths and concentrations of fluid segments A and B, a microreactor main unit 16 fixed according to the optimum condition may be additionally prepared. For example, a microreactor 10 may be additionally manufactured and used in which fluid segments have fixed sectional shapes, e.g., rectangular sectional shapes, such as the shape of a square or an oblong, parallelogrammatic shapes, triangular shapes, concentric circular shapes, zigzag shapes, or convex shapes as the sectional shapes in the diametral section at the entrance side of the microreactionchannel 12. Similarly, a microreactor 10 may be additionally manufactured and used which has, as a fixed factor, optimum numbers of segments, sectional shapes, arrangements, aspect ratios, widths or concentrations of fluid segments A and B.

The above-described microreactor 10 is manufactured by a fine processing technique. The following are examples of fine processing techniques for manufacture of the microreactor:

(1) LIGA technique based on a combination of X-ray lithography and electroplating (2) High-aspect-ratio photolithography using EPON SU8 (photoresist)

(3) Micromachining (such as microdrilling using a drill having a micron-order drill diameter and rotated at a high speed)

(4) High-aspect-ratio processing of silicon by deep RIE (reactive ion etching)

(5) Hot embossing (6) Rapid prototyping (7) Laser machining (8) Ion beam method

As materials for manufacture of the microreactor 10, materials selected from metals, glass, ceramics, plastics, silicon, Teflon, and other materials according to required characteristics such as heat resistance, pressuretightness, solvent resistance and workability can be suitably used.

Embodiment 1

In embodiment 1, multiple reaction of fluids A and B shown below was performed and the influence of changes in the number of segments, sectional shape, arrangement and aspect ratio in fluid segments on the yield and selectivity of a target product was checked by using a computational fluid dynamics (CFD) simulation. Fluid A is a solution in which a reaction raw material A is dissolved, and fluid B is a solution in which a reaction raw material B is dissolved. “Sectional shape” of fluid segments A and B denotes the shapes of fluid segments A and B in the diametral section of the microreactionchannel at the entrance side of the microreactionchannel.

Common conditions for this check will first be described.

It is assumed that multiple reaction expressed by a reaction formula and a reaction rate formula shown below is caused under a constant-temperature condition in the microreactionchannel. R represents a target product, and S represents a byproduct.

$$A+B\rightarrow R,\ r_1=k_1\,C_A\,C_B \qquad \text{(formula 1)}$$

$$B+R\rightarrow S,\ r_2=k_2\,C_B\,C_R \qquad \text{(formula 2)}$$

In these formulae, $r_i$ is the reaction rate in the ith stage [$kmol\cdot m^{-3}\cdot S^{-1}$]; $k_i$ is a reaction rate constant for the reaction rate in the ith stage, where k is 1 $m^3\cdot kmol\cdot m^{-1}\cdot S^{-1}$; and Cj is the molar concentration of component j [$kmol\cdot m^{-3}$]. The reaction order of each of the first and second stages of reaction is primary with respect to each component and is secondary with respect to the whole. Fluids A and B are supplied at a molar ratio 1:2 at the microreactionchannel entrance. The initial concentration is $C_{A0}$=13.85 $kmol\cdot m^{-3}$, $C_{B0}$=27.70 $kmol\cdot m^{-3}$. Flows in the microreactionchannel are laminar flows. Fluids A and B flow out of the fluid introduction channels into the microreactionchannel at equal flow rates of 0.0005 m/seconds. The channel length of the microreactionchannel is 1 cm and the average retention time during which fluids A and B stay in the microreactionchannel is 20 seconds. A nondimensional number indicating the influence of axial diffusion in the microreactionchannel (vessel dispersion number) is $D/uL=2\times10^{-4}$, and the influence of axial diffusion on mixing is extremely small. Changes in physical properties due to reaction are not considered and the physical properties of all the components are assumed to be identical to each other. The density is 998.2 $kg\cdot m^{-3}$, the viscosity 0.001 Pa·s, and the molecular diffusion coefficient $10^{-9}m^2\cdot s^{-1}$. A momentum preservation equation and a preservation equation for each component are solved by using a secondary-accuracy upwind difference method, and a pressure and rate coupling equation is solved by using a SINPLE method.

Figure 8:
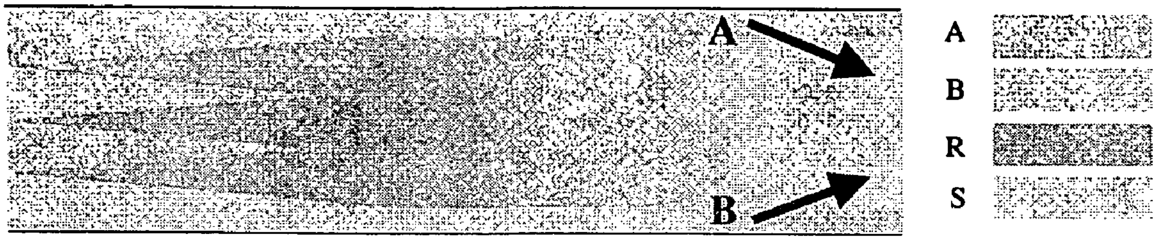
FIG. 8 is a diagram for explaining reaction of fluid segments at opposite ends of a microreactionchannel.

(1) Influence of Selection of the Numbers of Fluid Segments A and B on Progress of Multiple Reaction Of each of fluid segments A and B flowing along channel walls of the microreactionchannel at opposite ends, half on the wall side is not reacted with the reaction row material in the other fluid segment A or B since the raw material comes by diffusing only from the opposite side, as shown in FIG. 8. The left raw materials not reacted are diffused from the opposite ends to be mixed and reacted. Therefore, the raw materials in these portions of the fluid segments are reacted with a large delay from the reaction of the raw materials in the other portions. The influence of fluid segments A and B at the opposite ends of the microreactionchannel on the progress of reaction in the entire microreactionchannel is increased if the number of segment is smaller. Thus, the progress of reaction depends on the number of segments. In examination of the influence of selection of the configuration of fluid segments A and B made below, the effect of the configuration of fluid segments A and B can be examined more easily in a situation where the influence of fluid segments A and B at the opposite ends of the microreactionchannel is smaller. To avoid the influence of fluid segments A and B at the opposite ends, large numbers of fluid segments A and B may be arranged or a situation similar to an arrangement of infinite numbers of fluid segments A and B using a periodic boundary may be provided. The latter is more efficient if the computer load is considered. In the case of using a periodic boundary, however, the walls of the microreactionchannel are removed, the widthwise rate distribution is made flat, and there is, therefore, a possibility of the progress of multiple reaction in the microreactionchannel being changed. Examinations on two things were therefore made by performing a two-dimensional simulation. First, the minimum of the number of arranged fluid segments A and B with which substantially no dependence of the process of multiple reaction on the numbers of segments was observed was searched for. Also, the influence on the progress of multiple reaction in the microreactionchannel when infinite numbers of fluid segments A and B were arranged by using a periodic boundary and the influence when large numbers of fluid segments A and B were arranged were compared with each other.

Figure 9A:
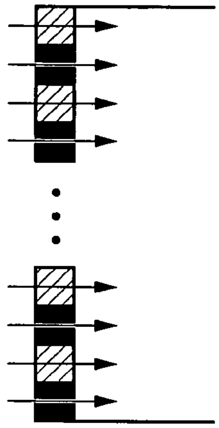
FIGS. 9A and 9B are diagrams for explaining a case of introducing fluid segments while changing the number of the fluid segments.
Figure 9B:
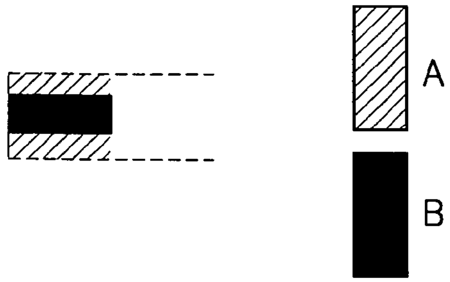

In the two-dimensional simulation, large numbers of fluid segments A and B in the form of thin layers flow one on another into flat parallel plates for the microreactionchannel to form parallel laminar flows, as shown in FIG. 9A. The width of one fluid segment is 100 μm and the number of fluid segments A and B is set to 2 (a pair of segments A and B), 4 (two pairs of segments A and B), 12 (six pairs of segments A and B), 20 (ten pairs of segments A and B), and 40 (twenty pairs of segments A and B). Calculation was also performed with respect to a case where infinite numbers of fluid segments A and B were arranged, i.e., a case where a periodic boundary was used as shown in FIG. 9B. The width of the passage is equal to the product of the number of segments and 100 μm. The calculation region is discretized with 2000 rectangular meshes per segment. The total number of meshes is 2000 times larger than the number of segments. For example, when the number of segments is 40, the total number of meshes is 80,000. In the case where the periodic boundary is used, the total number of meshes is 4,000 because the periodic boundary corresponds to a region for two segments.

Figure 10:
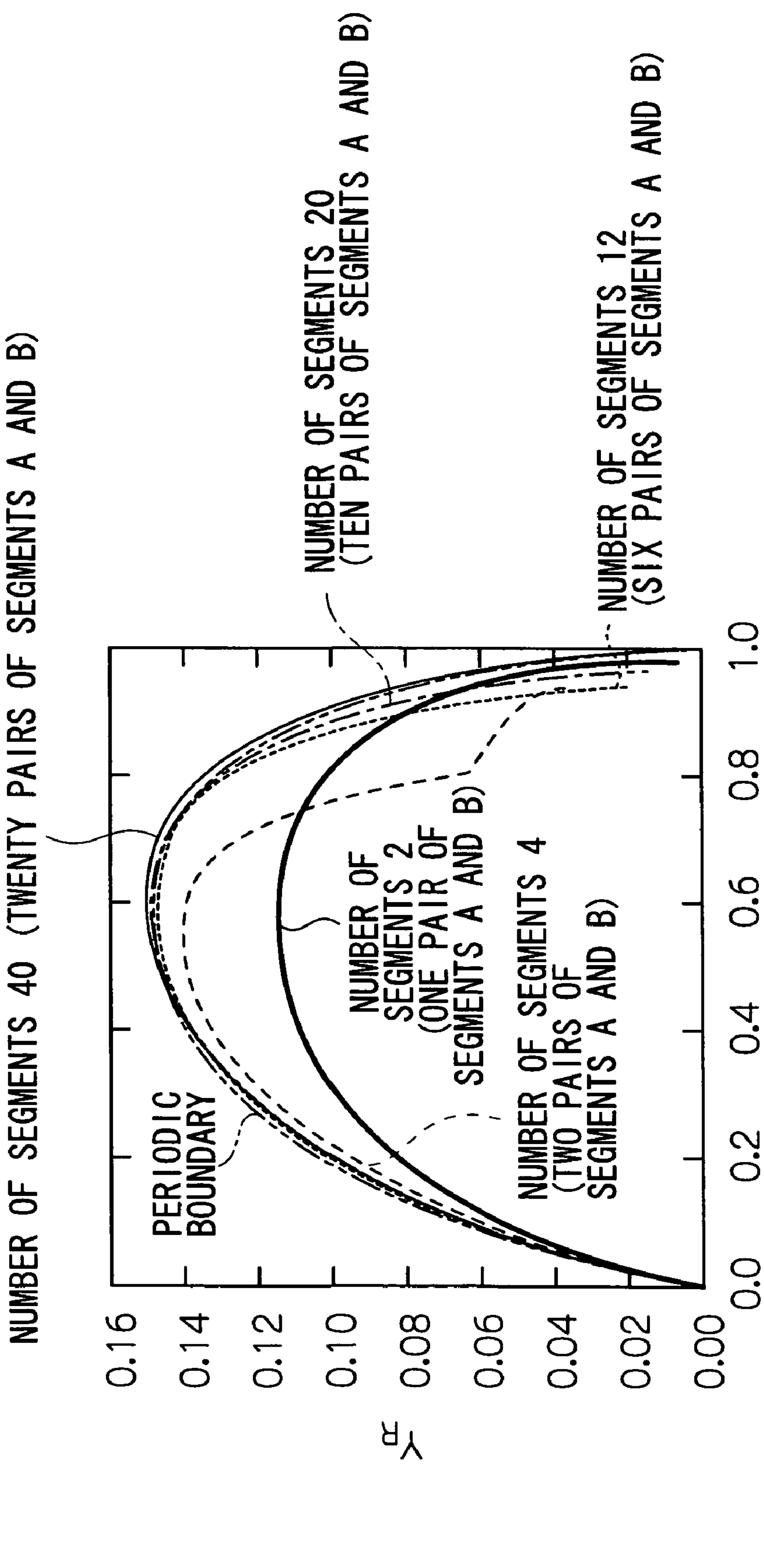
FIG. 10 is a diagram showing the relationship between the number of fluid segments and $Y_R$–xA.

FIG. 10 is a graph in which the yield $Y_R$ of R is plotted with respect to the rate of reaction $x_A$ of A in the microreactionchannel while being associated with the number of segments. Each of $x_A$ and $Y_R$ is obtained from the mass average in a cross section perpendicular to the lengthwise direction. FIGS. 11A, 11B, and 11C show distributions of the molar fraction $y_R$ of the target product R in the microreactionchannel. The left side of each figure corresponds to the entrance side of the microreactionchannel. The distributions in the case where the number of segments is 20 and the case where the number of segments is 40 are shown as representative examples. The maximum value $y_R$, max of $y_R$ in the microreactionchannel is also shown in FIG. 12 with respect to all the cases.

As can be understood from FIG. 10, the yield ($Y_R$) of R is higher if the number of fluid segments A and B parallel to each other is increased. If the number of segments is increased, the diffusion distance between fluid segments A and B is reduced while the specific surface area is increased. Therefore, the influence of a delay in mixing of fluid segments A and B at the opposite ends is reduced with the increase in the number of parallel segments. The reaction rate ($x_A$) does not reach 1.0 because the reaction of fluid segments A and B at the opposite ends does not progresses in the retention time 20 seconds to such a stage that the fluid segments A and B are diffused from the opposite ends to complete the reaction. When the number of segments is 4, the influence of fluid segments at the opposite ends is noticeable. The $Y_R$–$x_A$ curve when the number of segments is 4 is bent about $X_A$=0.8. This is because central fluid segments A and B start reacting earlier and fluid segments A and B at the opposite ends thereafter start reacting with delay. Further, $y_R$, max when the number of segments is 4 is highest. When the number of parallel fluid segments is larger than 20, the relationship between $Y_R$ and $x_A$ is substantially fixed and the $Y_R$–$x_A$ curve is substantially the same as that when the periodic boundary is used. As can be understood from FIG. 12, there is substantially no difference in $y_R$, max between the case where the number of segments is equal to or larger than 20 and the case of using the periodic boundary. In the case where fluid segments A and B are actually arranged, a parabolic rate distribution is formed in the widthwise direction. In the case where the periodic boundary is used, even the rate distribution actually calculated is flat in the widthwise direction. These rate distributions differ from each other. Further, in the $y_R$ distributions shown in FIG. 11, the segment width in the vicinity of each wall of the microreactionchannel is increased while the segment width at the center is reduced, because the reaction is accelerated at the center and is decelerated in the vicinity of the wall. On the other hand, in the case where the periodic boundary is used, the rate distribution is not changed and a concentration distribution parallel to the axial direction is therefore formed. The two cases differ both in rate distribution and in concentration distribution. However, it can be said that there is substantially no influence of this difference on the $Y_R$–$x_A$ curve. From the above, it can be understood that if twenty segments or so provided as fluid segments A and B (ten pairs of segments A and B) are arranged parallel, the influence of fluid segments A and B at the opposite ends is sufficiently small, the influence of the concentration distribution due to a difference in rate distributions is also small and, therefore, similar results can be obtained with respect to the averages of the yield and selectivity in the widthwise direction and the maximum molar fraction of the target product even by calculation using periodic boundary conditions.

Thus, selection of the number of fluid segments A and B influences the yield ($Y_R$) of target product R. In other words, it is possible either to increase or to reduce the yield of R by changing the number of fluid segments A and B. If R is a target product as in this embodiment, the yield of R can be increased. If S is a target product, the yield of S can be increased.

Figure 14:
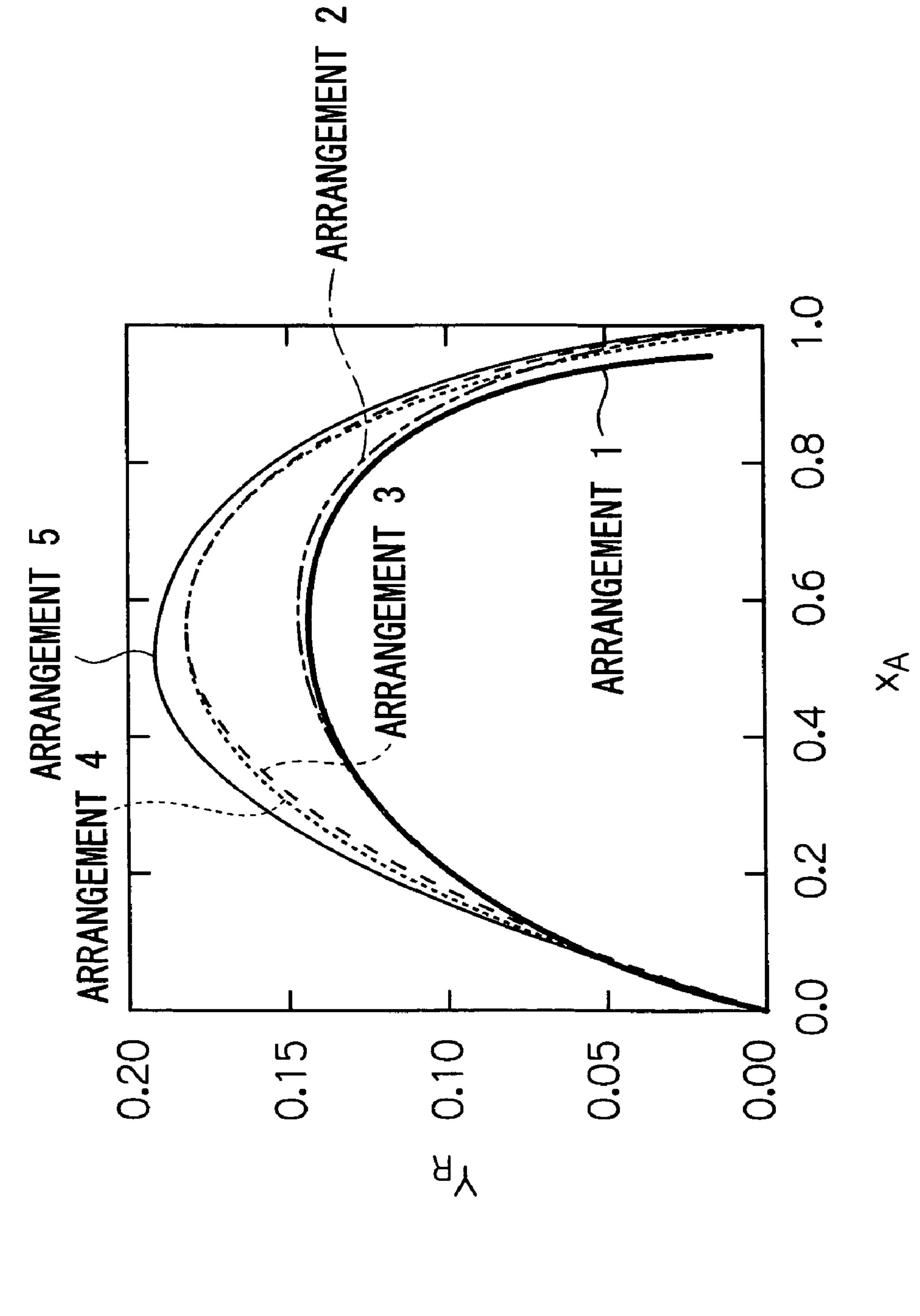
FIG. 14 is a diagram showing the relationship between fluid segment arrangement methods and $Y_R$–xA.

(2) Influence of the Method of Arranging Fluid Segments A and B on Progress of Multiple Reaction (2-1) Influence of the Arrangement Method on Progress of Multiple Reaction Progress of multiple reaction in the microreactionchannel when 100 μm square segments were arranged was calculated with respect to five arrangements such as shown in FIGS. 13A to 13E: an arrangement 1 (A) in which twenty segments provided as fluid segments A and B (ten pairs of segments A and B) were arranged in one row; an arrangement 2 (B) in which segments were periodically placed in one row in the horizontal direction; an arrangement 3 (C) in which two groups of segments each consisting of ten segments were arranged in two rows; an arrangement 4 (D) in which four groups of segments each consisting of five segments were arranged in four rows in a checkered pattern; and an arrangement 5 (E) in which segments were periodically placed in the vertical direction. In the periodic placements, portions indicated by dotted lines correspond to a periodic boundary. In each of the arrangements shown in FIGS. 13A and 13B, a symmetry boundary (not shown) is set at a center in the depth direction to reduce the calculation region to half of the same. The calculation region is discretized with rectangular meshes. The total number of meshes is 160,000 in FIG. 13A, 40,000 in FIG. 13B, 256,000 in each of FIGS. 13C and 13D, and 80,000 in FIG. 13E. FIG. 14 shows the relationship between $Y_R$ and $x_A$ in each segment arrangement. As can be understood from FIG. 14, $Y_R$ with respect to one $x_A$ varies since the specific surface area between fluid segments A and B changes depending on the way of arranging the segments, and the yield of R is increased in order of arrangement 1→arrangement 2→arrangement 3→arrangement 4→arrangement 5. There is substantially no difference between arrangement 1 and arrangement 2. It can therefore be understood that even when the number of dimensions is increased to three, if the number of segments is equal to or larger than 20 (ten pairs of segments A and B), a good match occurs between the results of calculation in a case where large numbers of fluid segments A and B are arranged and the results of calculation using a periodic boundary. The specific interface area is 9500 $m^{-1}$ in arrangement 1, 10000 $m^{-1}$ in arrangement 2, 14000 $m^{-1}$ in arrangement 3, 15500 $m^{-1}$ in arrangement 4, and 20000 $m^{-1}$ in arrangement 5, thus increasing from arrangement 1 to arrangement 5. The specific surface area is increased if the segments are arranged so that the entire area of the microreactionchannel at the entrance side is closer to a regular square.

Figure 16A:
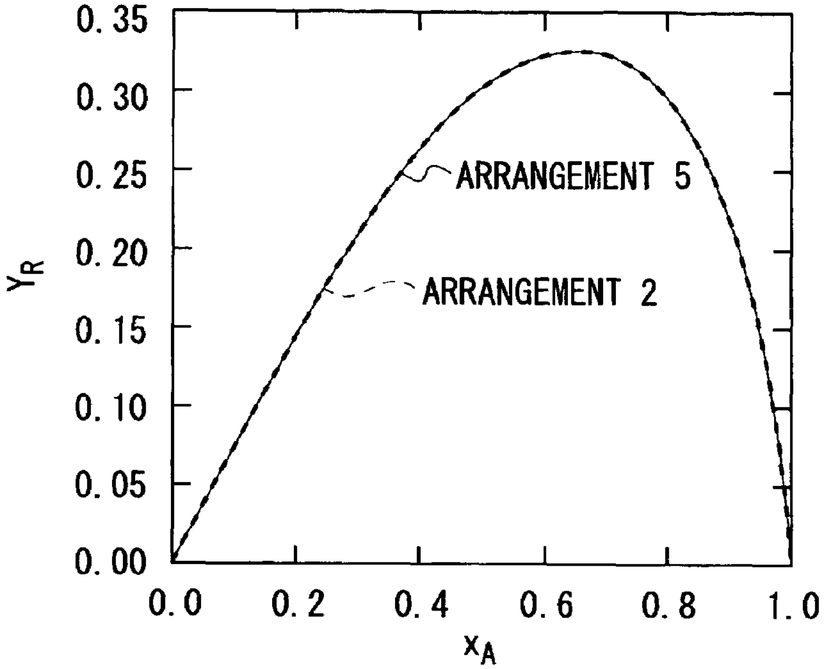
FIGS. 16A and 16B are diagrams of $Y_R$–$x_A$ when a one-horizontal-row periodic arrangement and a vertical periodic arrangement coincide with each other.
Figure 16B:
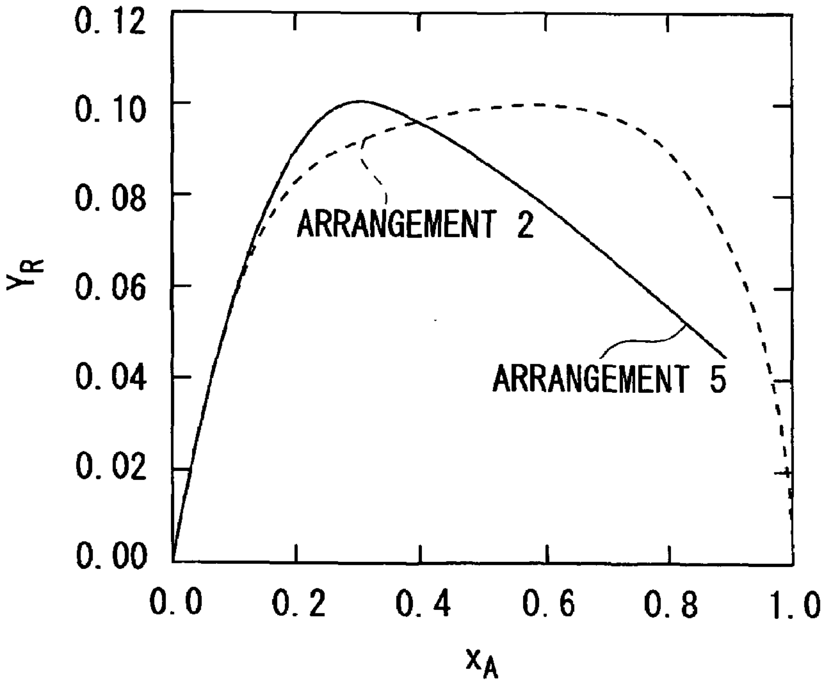

(2-2) Correspondence Between Vertical Periodic Arrangement and Horizontal-One-Row Periodic Arrangement To quantitatively examine a correspondence between arrangements, a correspondence between arrangement 2 (horizontal-one-row periodic arrangement) and arrangement 5 (vertical periodic arrangement) shown in FIGS. 13B and 13E was obtained. The length of one side of square fluid segments A and B in arrangement 2 was adjusted in association with that in arrangement 5 to equalize the maximum value $Y_R$, max of the yield of target product R to that in the case of arrangement 5. The length $W_5$ of one side of square fluid segments A and B of arrangement 5 was changed from one value to another among 25 μm, 50 μm, 100 μm, 200 μm, 300 μm, 400 μm, and 500 μm, and the length $W_2$ of one side of square fluid segments A and B in arrangement 2 for the same $y_R$, max as $y_R$, max corresponding to these values of length $W_5$ was obtained. FIG. 15 shows the results of this process. When $W_5$ is small, $0.65 \times W_5$ is equal to $W_2$ for the same $y_R$, max. As $W_5$ becomes larger, $W_2/W_5$ has a tendency to decrease. From these results, it can also be understood that the reactions depending on the arrangements are associated with each other not by the centroid distance or the specific surface area, and that the difference in specific surface area associated with $y_R$ becomes larger with diffusion control. FIG. 16A shows a $Y_R$–$x_A$ curve in a case where when 25 μm square fluid segments A and B are arranged in arrangement 5, 16 μm square fluid segments A and B are arranged in arrangement 2 to achieve the same $y_R$, max as that in the case of the arrangement of the 25 μm square fluid segments. FIG. 16B shows a $Y_R$–$x_A$ curve in a case where when 500 μm square fluid segments A and B are arranged in arrangement 5, 185 μm square fluid segments A and B are arranged in arrangement 2 to achieve the same $y_R$, max as that in the case of the arrangement of the 500 μm square fluid segments. As diffusion control is approached with the increase in the length of one side of square fluid segments A and B, a discrepancy occurs between the $Y_R$–$x_A$ curves, even though equality of $y_R$, max is achieved. This may be because the raw material is diffused also in the vertical direction in arrangement 5 while the raw material is diffused only in the horizontal direction, and because a significant difference due to the different diffusion directions appears when diffusion control is effected.

As can be understood from the above-described results, the method of arranging fluid segments A and B includes the yield ($y_R$) of target product R. In other words, it is possible either to increase or to reduce the yield of R by changing the method of arranging fluid segments A and B. If R is a target product as in this embodiment, the yield of R can be increased. If S is a target product, the yield of S can be increased. Also, if the specific surface area is increased by changing the arrangement, the yield ($y_R$) of R is increased. However, if the length of one of arranged fluid segments A and B is increased while the specific surface area is fixed, that is, diffusion control is approached, the yield of R is changed. This means that there is a need to also consider the length of one side of arranged fluid segments A and B for control of the yield ($y_R$) of R as well as to simply increase the specific surface area.

(3) Influence of the Aspect Ratio of Fluid Segments A and B on Progress of Multiple Reaction.

As the way of changing the aspect ratio, a case (3-1) where only the depth of fluid segments A and B was changed while the width of fluid segments A and B (thickness in the direction of arrangement of fluid segments A and B) was fixed, that is, the influence of the depth when diffusion distance was constant was examined, and a case (3-2) where the aspect ratio was changed so that the area of fluid segments A and B was constant in the diametral section were examined. Further, the length of one side of square fluid segments A and B corresponding in terms of the maximum value of the yield of target product R to rectangular fluid segments A and B changed in aspect ratio in arrangement 5 shown in FIG. 13E was obtained, and a correspondence between a case, if any, where the diffusion distance varied with respect to different directions and a case where the diffusion distance was isotropic was examined.

(3-1) Case of Changing the Depth While Fixing the Width

Figures 17A, 17B, 17C:
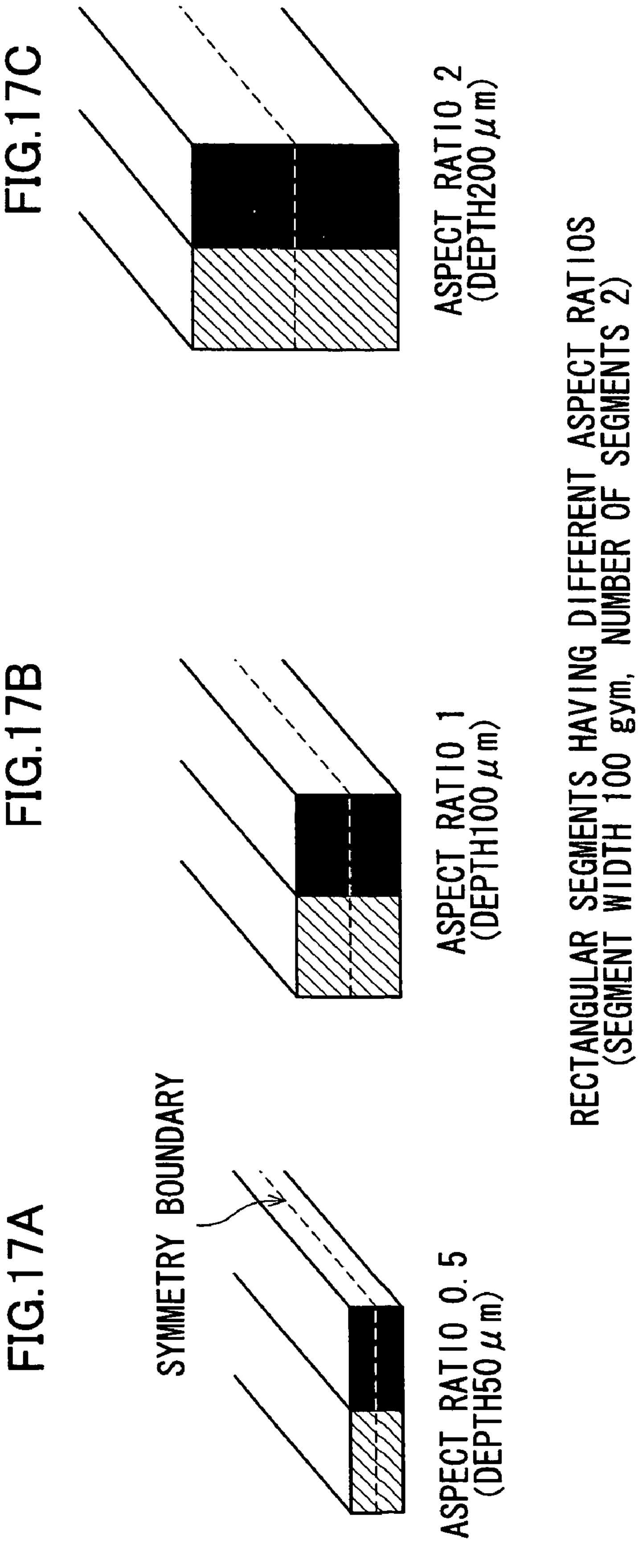
FIGS. 17A to 17C are diagrams showing fluid segments having different aspect ratios.

Rectangular fluid segments A and B had a fixed width of 100 μm and their aspect ratio was changed as shown in FIGS. 17A, 17B, and 17C. FIG. 17A shows a case where two fluid segments A and B (one pair of segments A and B) had a depth of 50 μm (an aspect ratio of 0.5), FIG. 17B shows a case where two fluid segments A and B had a depth of 100 μm (an aspect ratio of 1), and FIG. 17C shows a case where two fluid segments A and B had a depth of 200 μm (an aspect ratio of 2). Other cases (not shown): a case where twenty fluid segments A and B (ten pairs of segments A and B) had a depth of 400 μm (an aspect ratio of 4) and a case where twenty fluid segments A and B had a depth of 1000 μm (an aspect ratio of 10) were also examined.

The calculation region where a CFD simulation was performed has a symmetry in the depth direction and can therefore be reduced to half of its entire size by setting as a symmetry boundary a plane indicated by the dotted line in FIGS. 17A to 17C. The calculation region was discretized with 20,000 rectangular meshes in the case of two segments, with 160,000 rectangular meshes in the case of twenty segments, and with 40,000 rectangular meshes in the case where segments were periodically arranged in one row.

Figure 18A:
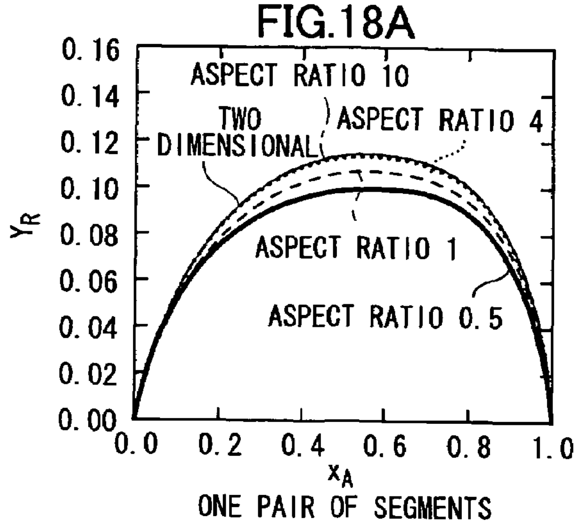
FIGS. 18A, 18B, and 18C are diagrams showing the relationship between the aspect ratio of fluid segments and $Y_R$–$x_A$.
Figure 18B:
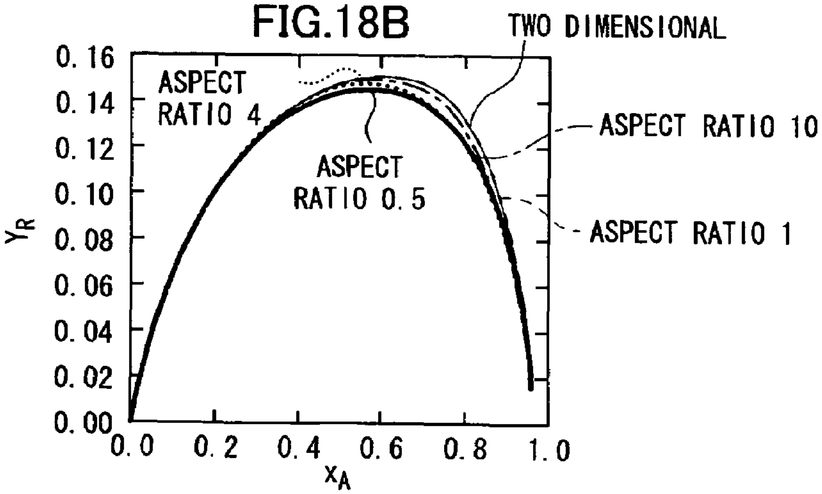
Figure 18C:
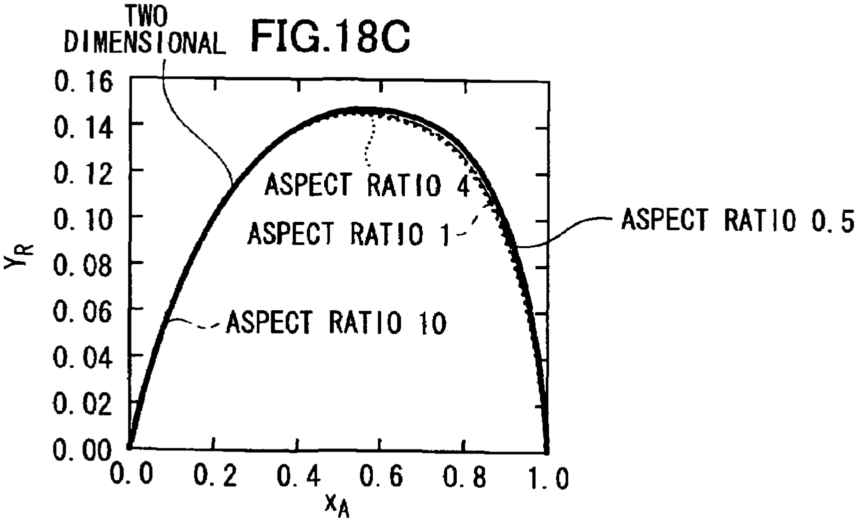
Figures 19A, 19B, 19C:
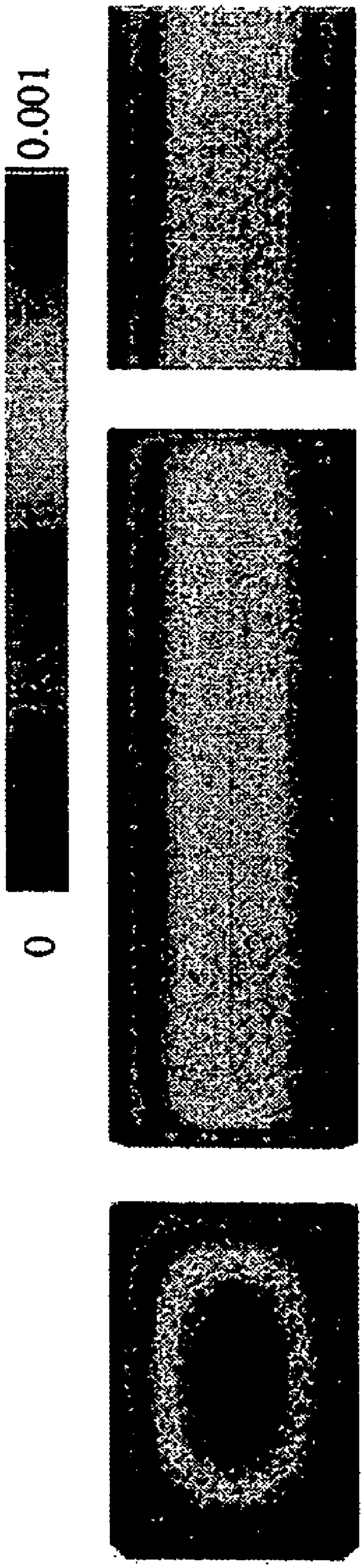
FIGS. 19A to 19C is a diagram showing a flow rate distribution in a cross section at a microreactionchannel exit.

FIGS. 18A, 18B, and 18C show graphs in which the relationship between $Y_R$ and $x_A$ in the microreactionchannel is plotted with respect to the numbers of segments and segment depths. For comparison, the corresponding relationship in a case where fluid segments A and B having a thin layer width of 100 μm were supplied to a two-dimensional parallel-flat-plate passage is also shown. FIG. 19 shows flow rate distributions in the exit cross section of the microreactionchannel when the segment depth was 100 μm. FIG. 20 shows the maximum flow rate in the exit cross section. When the number of fluid segments A and B is two (FIG. 18A) or twenty (FIG. 18B), $Y_R$ with respect to one $x_A$ value is lower if the aspect ratio is lower (that is, the depth of the segments is reduced). This may be because a rate distribution with a large gradient is also developed in the depth direction with the rate distribution in the widthwise direction due to laminar flows, as the yield and selectivity of the parallel reaction intermediate product become, step by step, lower under laminar flows than under a plug-flow. The results are substantially the same as those in the case of the two-dimensional parallel-flat-plate passage when aspect ratio is 4 or higher in the case where the number of segments is 2, and when the aspect ratio is 10 or higher in the case where the number of segments is 20. The difference in the relationship between $Y_R$ and $x_A$ with respect to the aspect ratio is smaller when the number of segments is 20 than when the number of segments is 2. This may be because the rate gradient in the widthwise direction in each segment is smaller when the number of segments is larger, and because the range in rate gradient in the widthwise direction is still small even when the aspect ratio is changed. In the case where the segments are periodically arranged in one row (FIG. 18C), the rate distribution in the widthwise direction is still flat even when the aspect ratio is changed, and the rate distribution in the depth direction coincides with the rate distribution between the parallel flat plates and is constant. Therefore the $Y_R$–$x_A$ curve is independent of the aspect ratio.

(3-2) Case of Changing the Depth While Constantly Maintaining the Segment Area.

Figure 21A:
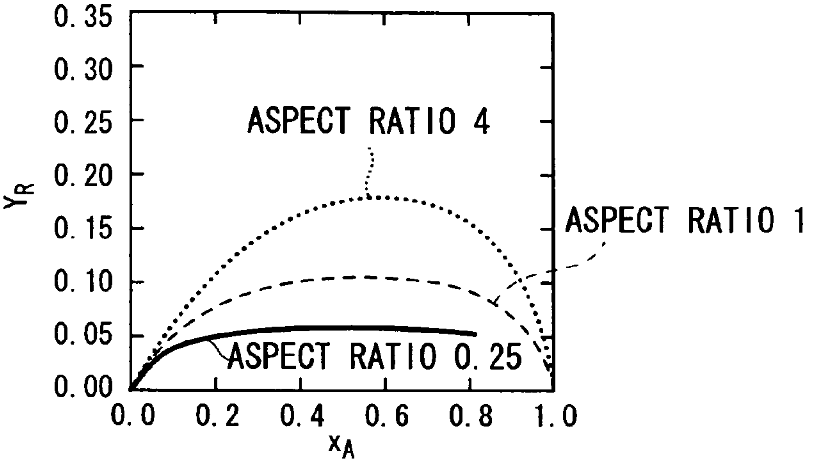
FIGS. 21A, 21B, and 21C are diagrams showing the relationship between the aspect ratio of fluid segments and $Y_R$–$x_A$.
Figure 21B:
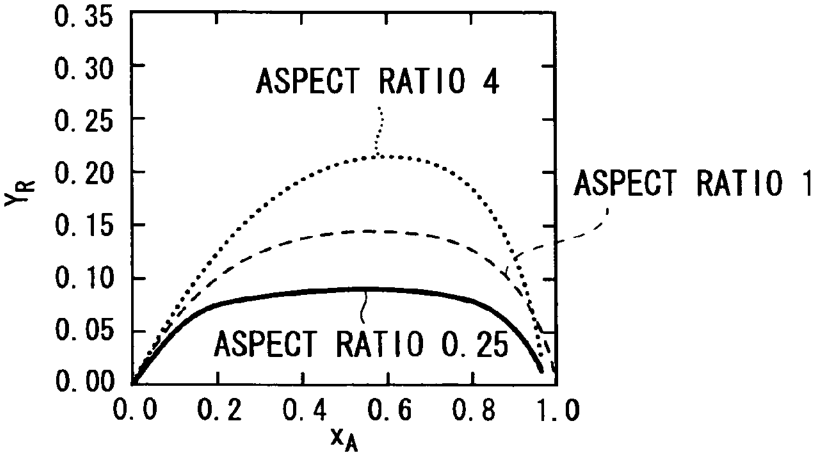
Figure 21C:
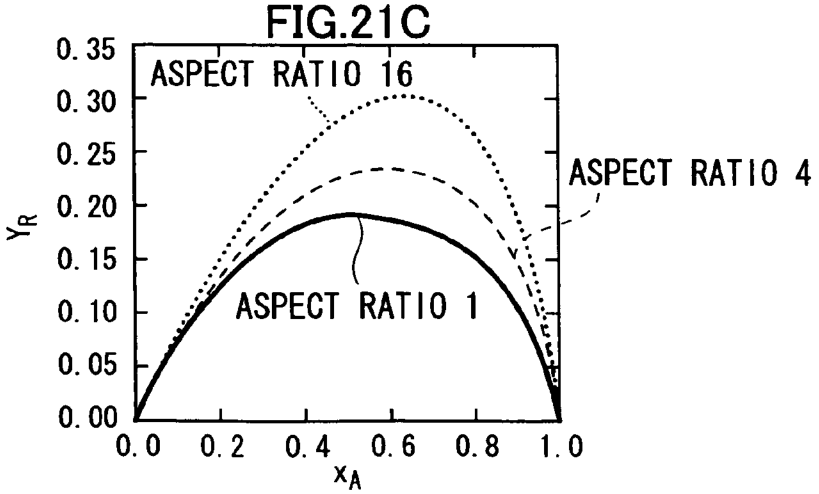

In (3-1), the area of each segment was changed with the depth, since the depth was changed while the segment width was constantly maintained. The segment depth and width were then changed so that the area was constant. Fluid segments A and B were changed in width and depth by selecting from three combinations of width and depth values: a width of 200 μm and a depth of 50 μm (an aspect ratio of 0.25), a width of 100 μm and a depth of 100 μm (an aspect ratio of 1), and a width of 50 μm and a depth of 200 μm (an aspect ratio of 4). Calculations were also performed with respect to the case where the number of fluid segments A and B is 2 (a pair of segments A and B) (the number of discretization meshes is 20,000), the case of a one-row periodic arrangement (the number of discretization meshes: 40,000) and the case of a vertical periodic arrangement (the number of discretization meshes: 80,000). FIGS. 21A, 21B, and 21C show graphs in each of which $x_A$ is plotted with respect to $Y_R$ when the aspect ratio is changed in one of the segment arrangements. In each arrangement method, $Y_R$ is higher if the width of fluid segments A and B is reduced. This can be said to be a foregone conclusion with respect to one pair of segments A and B and the one-row periodic parallel arrangement since the diffusion distance is short. In the case of the vertical periodic arrangement (FIG. 21C), however, the diffusion distance in the depth direction is increased, while the diffusion distance in the widthwise direction is reduced, whereas $Y_R$ is increased. From this result, it can be understood that the influence of the shorter diffusion distance appears more strongly.

(3-3) Correspondence Between Rectangular Segments and Square Segments

In the case of the vertical periodic arrangement (arrangement 5 in FIG. 13E), the aspect ratio is changed while the area of each segment is constantly maintained. When the shape is changed from the regular square to a rectangle, the diffusion distance is changed according to the direction and the specific surface area is further changed. To arrange a quantitative expression of the influence of a change in aspect ratio on progress of multiple reaction, the length of one side of the square fluid segments A and B arranged in the same manner as the rectangular fluid segments A and B in the vertical periodic arrangement and capable of making the same progress of reaction as that made with the rectangular fluid segments A and B was obtained. FIG. 22 shows the results of this process.

Figure 23A:
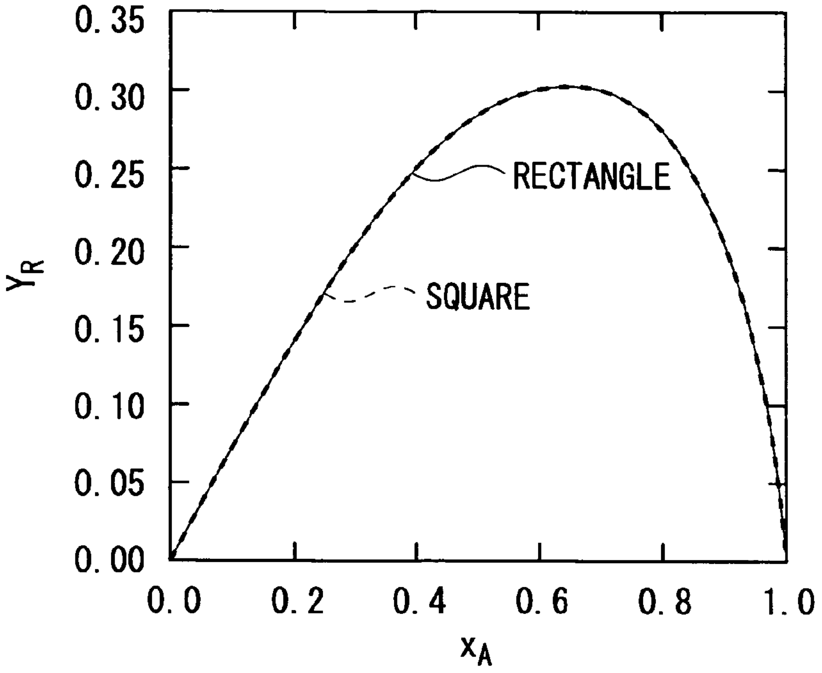
FIGS. 23A and 23B are diagrams of $Y_R$–$x_A$ when the maximum yield by rectangular segments and the maximum yield by square segments coincide with each other.
Figure 23B:
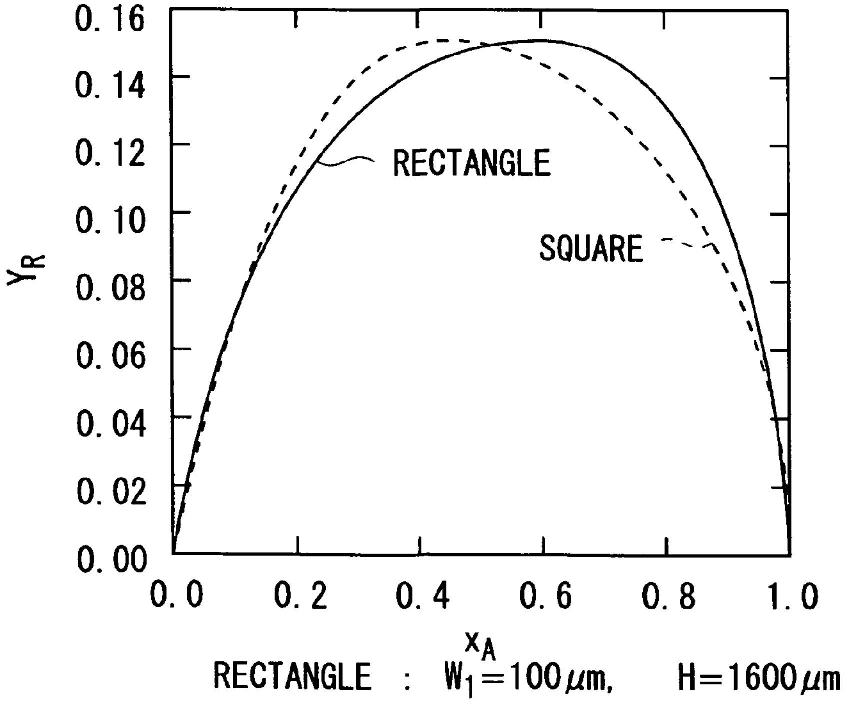

A correspondence between the specific surface areas and the maximum value $y_R$, max of the yield of R are also shown in FIG. 22. As can be understood from FIG. 22, the corresponding length $W_2$ of one side of the square fluid segments A and B is 1.4 to 1.5 times larger than the shorter side ($W_1$) of the rectangular fluid segments A and B except for the case where the aspect ratio is closer to 1. Non-correspondence in terms of specific surface area is also recognized here. Also, the $Y_R$–$x_A$ curves are not necessarily superposed correctly one on another even when the correspondence between the values $y_R$, max is recognized, as shown in FIGS. 23A and 23B. Such a discrepancy becomes larger with approach to diffusion control. This tendency is the same as that in the above-described results.

From the results shown above, it can be said that the aspect ratio of fluid segments A and B having a rectangular shape (the shape of one of rectangles) influences the yield ($y_R$) of target product R. In other words, it is possible either to increase or to reduce the yield of R by changing the aspect ratio of fluid segments A and B. If R is a target product as in this embodiment, the yield of R can be increased. If secondary product S is a target product, the yield of S can be increased.

(4) Influence of the Sectional Shape of Fluid Segments A and B on Progress of Multiple Reaction The influence of selection of the sectional shape of fluid segments A and B in the diametral section of the microreactionchannel from various shapes other than the square or rectangular shape on the progress of multiple reaction and the concentration distribution in the microreactionchannel was examined. With respect to each shape, the length of one side of square fluid segments A and B capable of setting the maximum yield of the same target product was obtained. Further, the influence of a change in the reaction rate constant with respect to each shape on the progress of reaction was examined.

(4-1) Influence of Selection of the Sectional Shape of Fluid Segments A and B on Progress of Multiple Reaction As shown in FIGS. 24 to 26, a simulation was performed by changing the sectional shape of fluid segments A and B in the diametral section of the microreactionchannel among squares, parallelograms, triangles, zigzag shapes, convex shapes, and concentric circles to examine the influence on the progress of multiple reaction.

With respect to the squares, parallelograms and triangles, calculation was performed on a periodic arrangement in one horizontal row and a vertical periodic arrangement. With respect to the segments in the zigzag shapes and the segments in the convex shapes, calculation was performed only on a periodic arrangement in one horizontal row. In the zigzag shapes, a symmetry boundary is used at a center in the depth direction, as indicated by a thick line in FIGS. 25G to 25K. In concentric circles shown in FIG. 26L, ten pairs of fluid segments A and B are arranged so that the area of each segment is equal to the area of each square. FIG. 27 shows the radii of the concentric segments. In the CFD simulation, a center of the concentric circles for the concentric fluid segments A and B formed in the microreactionchannel is set as a rotational symmetry axis, as shown in FIG. 26L, to enable calculation of the entire microreactionchannel by two-dimensional simulation. In the fluid segments A and B having shapes other than the square, the area of each fluid segments A and B is such that the width W and height H are the same as the 100 μm square segment. FIG. 28 shows a method of discretizing the calculation region.

Figure 29A:
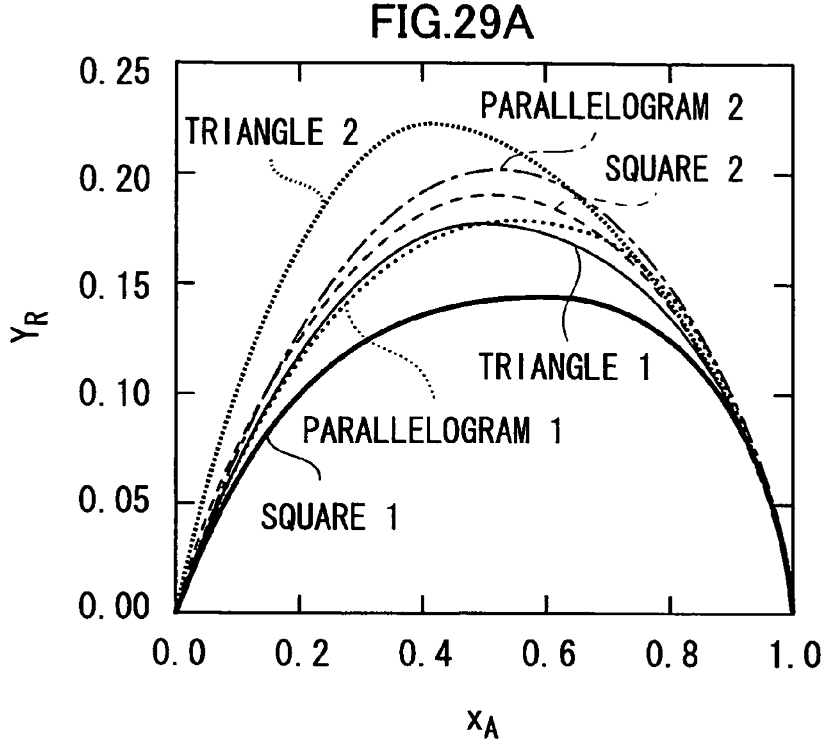
FIGS. 29A and 29B are diagrams showing the relationship between the sectional shape of fluid segments and $Y_R$–$x_A$.
Figure 29B:
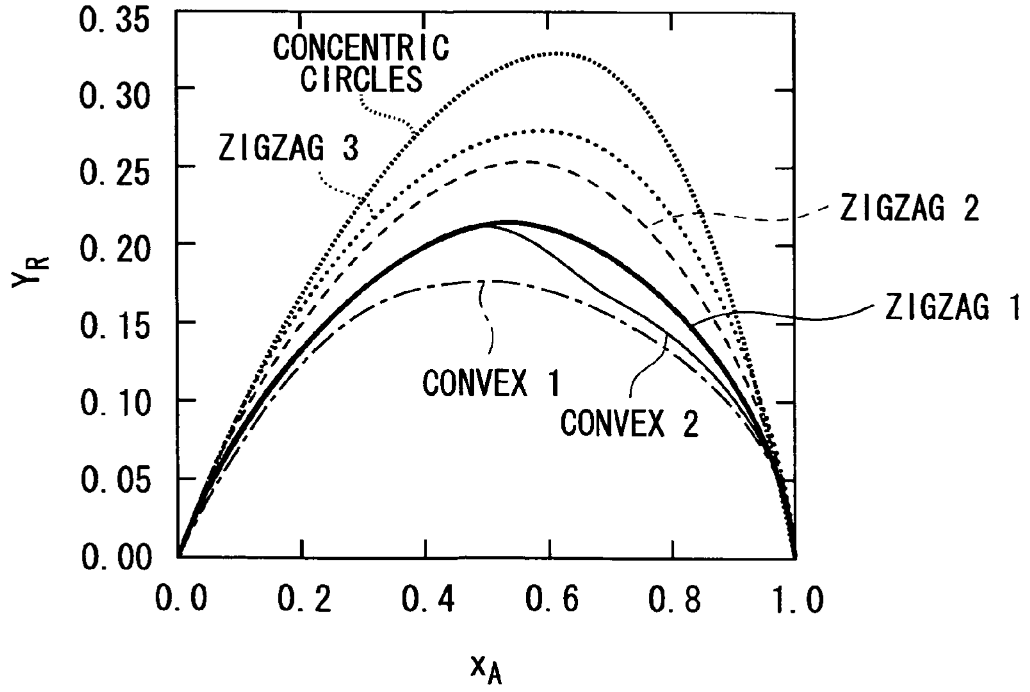

FIGS. 29A and 29B show the relationship between $Y_R$ and $x_A$ in the microreactionchannel. FIG. 29A shows the results with the squares, parallelograms, and triangles, and FIG. 29B shows the results with the zigzag shapes, convex shapes and concentric circles. When the fluid segments A and B are equal in width, $Y_R$ with respect to the same $x_A$ is increased in order of square→parallelogram→triangle→concentric circle. This is because the substantial diffusion distance is reduced in this order. In the fluid segments in the form of concentric circles, if the width corresponds to a radius obtained from a hydraulic power equivalent diameter, the width of the segment at the ninth and other outside position ($r_9$) from the inside is 10 μm or less. It is thought that in the microreactionchannel having the concentric fluid segments mixing progresses extremely rapidly and the yield ($Y_R$) of R is therefore high. In the microreactionchannel having the fluid segments A and B having the zigzag or convex shapes, the specific surface area of the fluid segments A and B is increased with the increase in the number of times the shape recurs, and mixing is thereby accelerated to improve the yield $Y_R$ of R.

(4-2) Correspondences Between the Shapes of Fluid Segments A and B

It can be understood from the results shown in (4-1) that the progress of reaction changes if the shape is changed while the area of fluid segments A and B is fixed. Correspondences between the shapes of fluid segments A and B were also examined. FIG. 30 shows the widths, and specific surface area of fluid segments A and B varied in sectional shape, and the width (W), specific surface area and $y_R$, max of R-yield maximum $y_R$, max matching rectangles. The shapes of fluid segments A and B and the names of the shapes are the same as those shown in FIGS. 24 to 26, and 28. In the fluid segments A and B periodically arranged in a horizontal row, the width (W) of square 1 shown in FIG. 24A with the segment height (H) fixed at 100 μm was changed for adjustment in $y_R$, max. In the fluid segments A and B arranged vertically periodically, W in W=H of square 2 shown in FIG. 24B was changed for adjustment in $y_R$, max. From the results thereby obtained, a tendency of $y_R$, max to increase with the increase in specific surface area is recognized. However, non-coincidence in terms of specific surface area is also recognized here even when the values $y_R$, max coincide with each other. FIGS. 31A and 31B respectively show the results of examination of the $Y_R$–$x_A$ relationship when rectangular fluid segments A and B of such sizes that that the respective $y_R$, max values coincided with those in a case where W and H of convex shape 2 shown in FIG. 25K were 25 μm and 100 μm, respectively, and a case where W and H of convex shape 2 were 400 μm and 100 μm, respectively, were provided in the microreactionchannel. Also, FIGS. 31C and 31D respectively show the results of examination of the $Y_R$–$x_A$ relationship when rectangular fluid segments A and B of such sizes that that the respective $y_R$, max values coincided with those in a case where W and H of triangule 2 shown in FIG. 24F were 25 μm and 25 μm, respectively, and a case where W and H of trigle 2 were 400 μm and 400 μm, respectively, were provided in the microreactionchannel. It can be understood therefrom that $Y_R$–$x_A$ curves do not coincide with each other even when the values $y_R$, max coincide with each other, if W is so large that diffusion control is approached.

(4-3) Arrangement of Expression of the Diffusion and Reaction Rate by Nondimensional Number with Respect to Each Shape Correspondence in terms of progress of reaction between fluid segments A and B differing in sectional shape and the influence of each shape on the process of reaction with respect to the width were examined by fixing the reaction rate constant and by considering the segment area and the specific surface area per microreactionchannel volume between the segments. The influence of the width of fluid segments A and B and the reaction rate constant on the progress of reaction in each sectional shape was then examined. A check was made as to whether or not there was a correspondence in terms of progress of reaction between a case where the reaction rate constant was quadrupled and the size of fluid segments A and B was reduced to half while the similarity of the shape was maintained and a case where fluid segments A and B were in the original size and the original reaction rate constant was used. More specifically, a check was made as to correspondence in terms of progress of reaction in a case where W was 200 μm, H was 50 μm and the reaction rate constant k was 4, a case where W was 400 μm, H was 100 μm and the reaction rate constant k was 1, a case where W was 25 μm, H was 50 μm and the reaction rate constant k was 4, and a case where W was 50 μm, H was 100 μm and the reaction rate constant k was 1. W and H correspond to the values shown in FIGS. 24 and 25, and k is the reaction rate constant $k_1=k_2=k$ in the reaction formula shown above.

FIGS. 32A to 32D respectively show the correspondences in the relationship between $Y_R$ and $x_A$ with respect to the case where W was 200 μm, H was 50 μm and the reaction rate constant k was 4 in parallelogram 2 (see FIG. 24D) and zigzag shape 1 (see FIG. 25G), the case where W was 400 μm, H was 100 μm and the reaction rate constant k was 1, a case where W was 25 μm, H was 50 μm and the reaction rate constant k was 4, and a case where W was 50 μm, H was 100 μm and the reaction rate constant k was 1. It can be understood that as long as the shape is changed while the similarity is maintained, the $Y_R$–$x_A$ curves correspond to each other. However, when W is large, k is small, reaction and diffusion are retarded and the final reaction rate is therefore reduced relative to that in a case where W is small and k is large. This is particularly noticeable with respect to the correspondence in the case where W is 200 μm, H is 50 μm and the reaction rate constant k is 4 and the case where W is 400 μm, H is 100 μm and the reaction rate constant k is 1. Also, there is a slight difference between the $Y_R$–$x_A$ curve in the case where W is 25 μm, H is 50 μm and the reaction rate constant k is 4 and the $Y_R$–$x_A$ curve in the case where W is 50 μm, H is 100 μm and the reaction rate constant k is 1. This may be because the reaction progresses extremely rapidly and progresses in a rate approach-run period and because the result is due to the difference between the rate distributions in the space in which the reaction progresses. Similar tendencies were observed with respect to the other shapes. From the results shown above, it can be understood that the progress of the reaction expressed by the reaction formula shown above can be expressed by the following formula when the shape is fixed:

$$\phi_i = k_i C_{BO}^{n-1} L^2 / D$$

where L is a typical length of the shape. It is thought that if a method for expressing the representative length for each sectional shape (the quantity having a length dimension determined for each sectional shape) is provided, the progress of the reaction can be expressed only with a nondimensional number independently of the sectional shape. However, since the concentration distribution varies largely depending on the sectional shape, it is supposed that it is difficult to express the progress of the reaction with respect to all the shape with such a nondimensional number.

According to the results shown above, the shapes of fluid segments A and B in the diametral section of the microreactionchannel influence the yield ($y_R$) of target product R. In other words, it is possible either to increase or to reduce the yield of R by changing the shape of fluid segments A and B. If R is a target product as in this embodiment, the yield of R can be increased. If secondary product S is a target product, the yield of S can be increased. Also, if the specific surface area is increased by changing the shape, the yield ($y_R$) of R is increased. However, if the shape is changed while the specific surface area is fixed, the yield of R is changed. This means that there is a need to also suitably control the shape for control of the yield ($y_R$) of R as well as to simply increase the specific surface area.

Embodiment 2

(5) As embodiment 2, the results of check by CFD simulation of the influence of a change in the method of arranging fluid segments A and B differing in width or a change in the method of arranging fluid segments A and B differing in raw-material concentration on the yield and selectivity of the target product will be described.

As a common setting for simulation, it is assumed that reaction expressed by formulae 3 and 4 shown below progresses in the microreactionchannel and that $k_1=k_2=1$ $m^3$ (kmol·s)

$$A+B \rightarrow R,\ r_1=k_1 C_A C_B \quad \text{(formula 3)}$$

$$B+R \rightarrow S,\ r_2=k_2 C_B C_R \quad \text{(formula 4)}$$

The channel length of the microreactionchannel is 1 cm, the entrance flow rate is 0.0005 m/seconds, and the average retention time of retention in the mmppp is 20 seconds. The physical properties of the reaction fluids are a density of 998.2 kg·m, a molecular diffusion coefficient D of $10^{-9} m^2 \cdot S^{-1}$, a molecular weight of $1.802 \times 10^{-2}$ kg/mol, and a viscosity of 0.001 Pas.

(5-1) Case Where There is a Difference in Width Among Fluid Segments A and B

A case where there is a difference between the widths of segments of each kind in fluid segments A and B will first be considered. The relationship between $Y_R$ and $x_A$ was examined by calculation with respect to cases such as shown in FIGS. 34A to 34D, i.e., a case (FIG. 34A) where fluid segments A and B uniform in width are placed between parallel plates provided as the microreactionchannel, a case (FIG. 34B) where fluid segments A and B larger in width are placed at a center, a case (FIG. 34C) where fluid segments A and B smaller in width are placed at a center, and a case (FIG. 34D) where fluid segments A and B smaller in width are placed in an upper portion and fluid segments A and B larger in width are placed in a lower portion. The raw material introduction concentration of fluid segment B is $C_{BO}=27.7$ kmol/$m^3$, and $C_{BO}/C_{AO}=2$. Discretization was performed with rectangular meshes. The total number of meshes is shown in FIG. 33. The width of each of the four segments in arrangement 1 is 50 μm. The width of the smaller segments in arrangements 2 to 4 is $W_1$, and the width of the larger segments in arrangements 2 to 4 is $W_2$. A combination of smaller and larger segments having $W_1=25$ μm and $W_2=75$ μm and another combination of smaller and larger segments having $W_1=10$ μm provide the average segment width of 50 μm in each case.

Figure 35A:
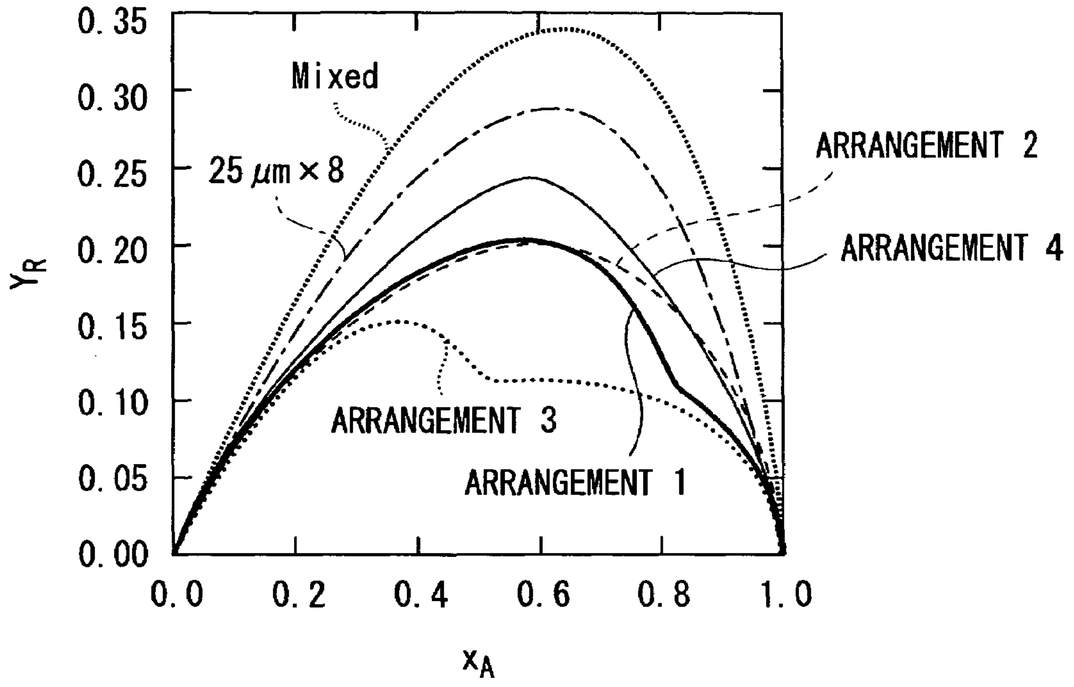
FIGS. 35A and 35B are diagrams showing the relationship between the different arrangements of fluid segments differing in width and $Y_R$–$x_A$.
Figure 35B:
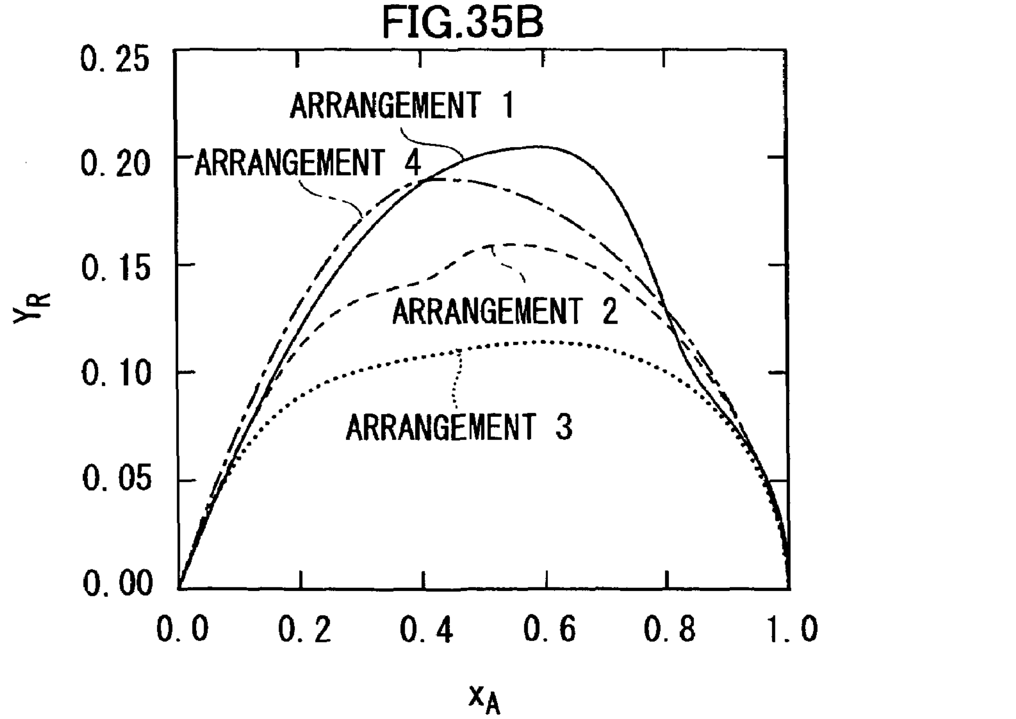
Figures 38A, 38B, 38C, 38D:
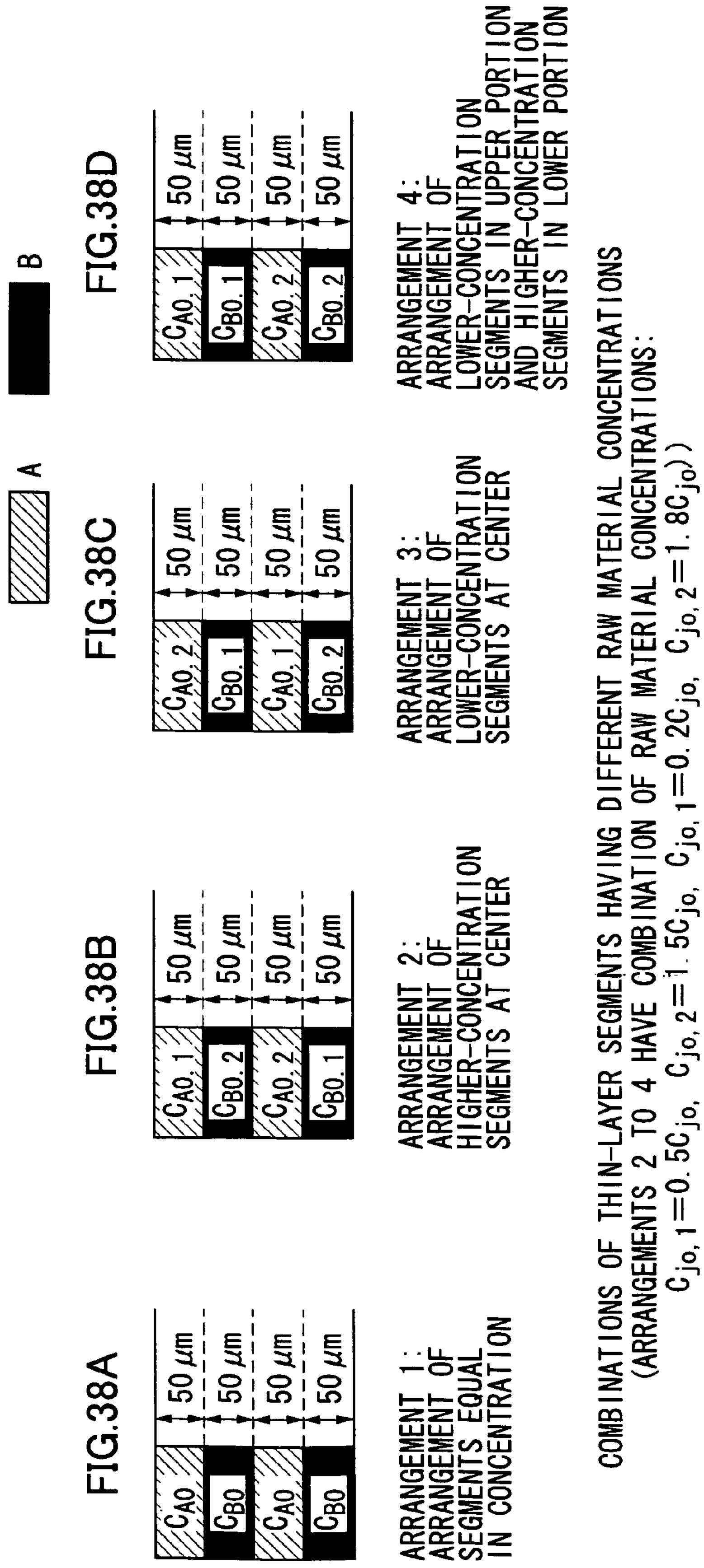
FIGS. 38A to 38D are diagrams showing methods of arranging fluid segments differing in raw material concentration.

The total number of rectangular meshes for disretization in arrangement 1 is 8,000, the number of disretization meshes in each of arrangements 2 and 3 is 12,000, and the number of disretization meshes in arrangement 4 is 10,000. The segment width in arrangement 1 is 50 μm, the larger segment width in arrangements 2 to 4 is 75 μm or 90 μm, and the smaller segment width in arrangements 2 to 4 is 25 μm or 10 μm. FIGS. 35A and 35B show the relationship between $x_A$ and $Y_R$ in the microreactionchannel with respect to these four types of arrangement. For comparison, the results in a case where fluid segments A and B were introduced into the microreactionchannel after being completely mixed (referred to as "Mixed") and a case where eight 25 μm wide segments (four pairs of segments A and B) were arranged are also shown in FIGS. 35A and 35B.

In the case where $W_1$=25 μm and $W_2$=75 μm (FIG. 35A), similar $Y_R$–$x_A$ curves are exhibited with respect to placements 1 and 2. However, since the size of the fluid segments A and B at the opposite ends in placement 2 is smaller, the curve in the case of placement 2 is free from bending such as that seen at $x_A$=0.8 in the case of placement 1. The yield ($Y_R$) in the case of arrangement 3 is lowest because R produced in the central segments A and B reacts with the fluid segment B and because the production of R cannot progress easily since the fluid segments A and B are divided into upper and lower layers. The yield ($Y_R$) in the case of arrangement 4 is highest because mixing progresses rapidly between the upper two fluid segments A and B in the passage to promote the production of R, and because the fluid segment A mainly exists closer to these fluid segments A and B to limit the occurrence of consumption of R by the reaction expressed by the formula 4.

In the case where $W_1$=10 μm and $W_2$=90 μm (FIG. 35B), the yield ($Y_R$) of R is reduced in order of arrangement 4→arrangement 2→arrangement 3, as is that in the case where $W_1$=25 μm and $W_2$=75 μm. However, the influence of the large-width fluid segments A and B in the width direction becomes stronger to increase the effective diffusion distance. As a result, the yield ($Y_R$) of R in the case of any of arrangements 2 to 4 is lower than that in the case of arrangement 1.

Thus, the method of forming fluid segments A and B so that fluid segments of each kind differ in width, and selecting the way of arranging these segments influences the yield ($Y_R$) of target product R. In other words, it is possible either to increase or to reduce the yield of R by suitably setting the method of arranging fluid segments A and B differing in width. If R is a target product as in this embodiment, the yield of R can be increased. If secondary product S is a target product, the yield of S can be increased.

Also, as shown in FIG. 35A, "Mixed" has the highest $Y_R$ as compared in terms of mass average in the widthwise direction. However, as can be understood from the distributions of the molar fraction $y_R$ of R in the microreactionchannel shown in FIG. 36 with respect to "Mixed", "25 μm×8", arrangement 2 and arrangement 4 and the maximum $y_{R}$, max of yR in the microreactionchannel shown in FIG. 37 with respect to the arrangements of fluid segments A and B differing in width, the R molar fraction in the case of "25 μm×8" and arrangements 1 to 4 is locally higher than that in the case of "Mixed". This may be because while part of R produced at the interface between the fluid segments A and B and diffused into the fluid segment B is immediately consumed by the reaction in the second stage (formula 4), R diffused into the fluid segment A is maintained so that the concentration of R is locally increased. If the configuration and the position of the exit from the microreactionchannel are determined according to the widthwise concentration distribution generated as described above, it is possible to recover the target product at a higher concentration. For example, in arrangement 4, the exit may be set at such a position that yR is maximized, and formed so as to diverge into upper and lower passage, and R may be extracted through the upper passage.

(5-2) Case Where Different Raw Material Concentrations are Provided in Fluid Segments A and B.

A case where different raw-material concentrations are provided in each kind in fluid segments A and B will next be considered. The relationship between $Y_R$ and $x_A$ was examined by calculation with respect to cases such as shown in FIGS. 38A to 38D, i.e., a case (FIG. 38A) where pairs of fluid segments A and B having equal widths of 50 mm are placed between parallel plates provided as the microreactionchannel, and where the raw material concentrations in two of the segments are equal to each other, a case (FIG. 38B) where fluid segments A and B having a higher concentration are placed at a center while fluid segments A and B having a lower concentration are placed at the opposite ends, a case (FIG. 38C) where fluid segments A and B having a lower concentration are placed at a center while fluid segments A and B having a higher concentration are placed at the opposite ends, and a case (FIG. 38D) where fluid segments A and B having a lower concentration are placed in an upper portion and fluid segments A and B having a higher concentration is placed in a lower portion.

Discretization was performed with rectangular meshes. The total number of meshes is 8,000 in any of the arrangements. The raw material concentrations in arrangement 1 are $C_{A0}$=6.92 kmol/m$^3$ in fluid segment A and $C_{B0}$=13.85 kmol/m$^3$ in fluid segment B. In arrangements 2 to 4, the raw material concentration in the lower-concentration fluid segments A and B is expressed by $C_{j0,1}$, the raw material concentration in the higher-concentration fluid segments A and B is expressed by $C_{j0,1}$ (j=A, B), and a combination of raw material concentrations $C_{j0,1}=0.5C_{j0}$, $C_{j0,2}=1.5C_{j0}$, or $C_{j0,1}=0.2C_{j0}$, $C_{j0,2}=1.8C_{j0}$ are provided. The average raw material concentration corresponds to $C_{A0}$ or $C_{B0}$ in all the cases.

Figure 39A:
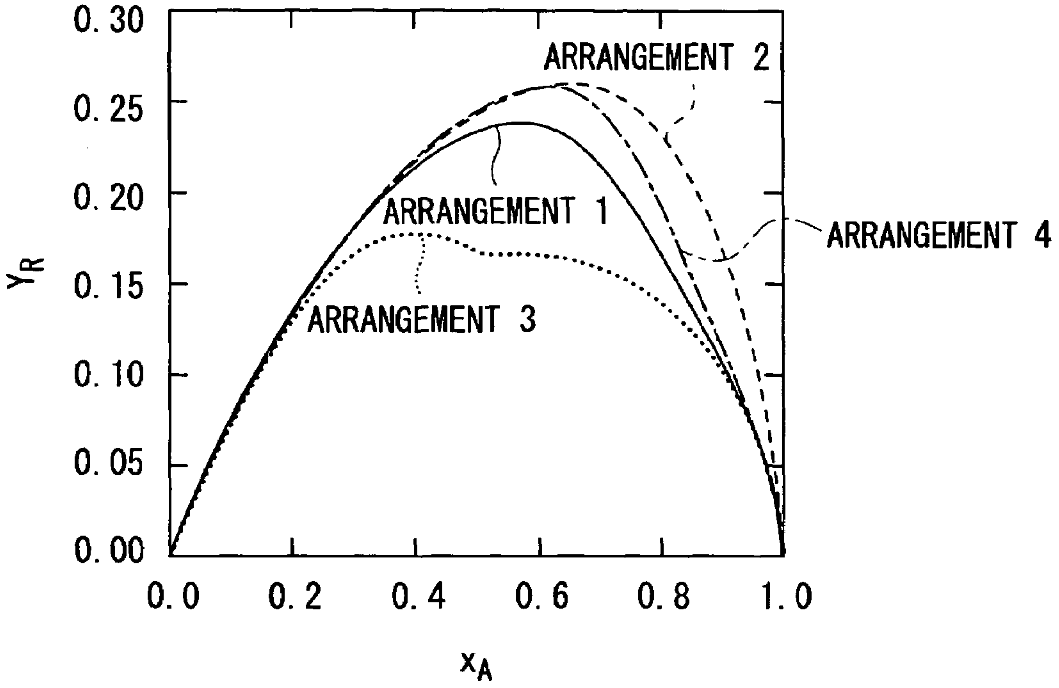
FIGS. 39A and 39B are diagrams showing the relationship between different arrangements of fluid segments differing in raw material concentration and $Y_R$–$x_A$.
Figure 39B:
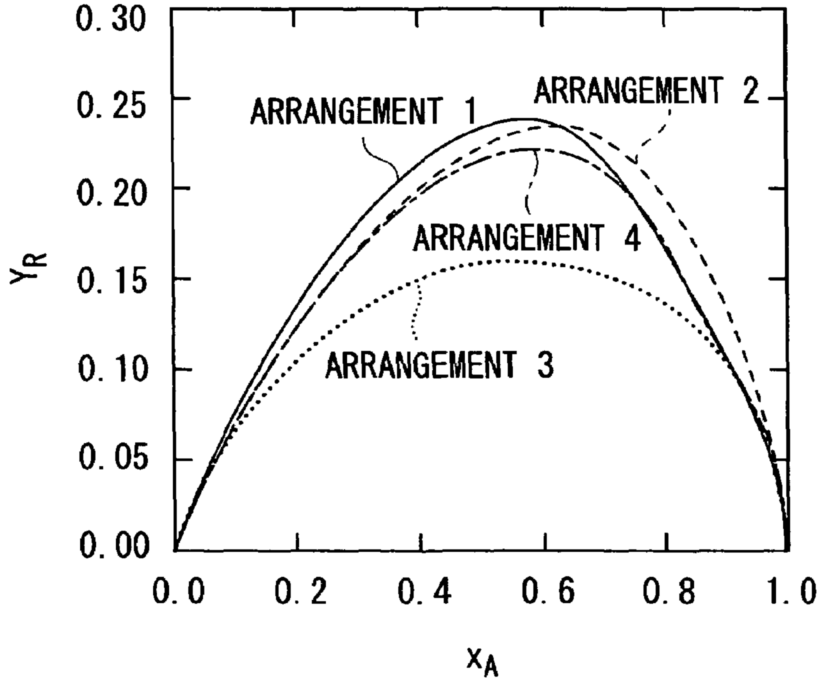

FIGS. 39A and 39B show the relationship between $x_A$ and $Y_R$ in the microreactionchannel with respect to these four types of arrangement.

The case where fluid segments A and B have the combination of raw material concentrations $C_{j0,1}=0.5C_{j0}$, $C_{j0,2}=1.5C_{j0}$ will first be examined. $Y_R$ in the case of placement 2 is highest as shown in FIG. 39A. Two causes of this result are conceivable. First, mixing and reaction of the fluid segments A and B at the center of the microreactionchannel progress more rapidly due to diffusion from the mated components for reaction from the opposite sides, while mixing and reaction of the fluid segments A and B at the upper and lower positions are retarded since each mated component is diffused to the fluid segment A or B from only one side. However, the raw material concentrations in the upper and lower fluid segments A and B are lower and the proportions of the raw materials supplied from the upper and lower fluid segments A and B are lower. Therefore the influence due to the delay in mixing between the upper and lower fluid segments A and B is small. Second, since the fluid segment A having the higher concentration and the fluid segment B having the lower concentration contact each other, the reaction in the first stage expressed by the formula shown above (formula 3) progresses advantageously in the vicinity of this contact surface. This explanation also applies to arrangement 4. Therefore $Y_R$ in the case of arrangement 4 is also high. $Y_R$ in the case of placement 3 is lowest because R produced in the central fluid segments A and B is reacted with B, and because the production of R cannot progress easily since the fluid segments A and B having the higher raw material concentration are divided into upper and lower layers. The yield of R in the case of arrangement 4 is highest because mixing between the upper two fluid segments A and B having the higher raw material concentration in the microreactionchannel progresses rapidly to promote the production of R, and because the fluid segment A mainly exists closer to these fluid segments to limit the occurrence of consumption of R by the reaction in the second stage expressed by formula shown above (formula 4). In the results with the combination of fluid segments A and B having raw material concentrations $C_{j0,1}=0.2C_{j0}$, $C_{j0,2}=1.8C_{j0}$, $Y_R$ is slightly reduced with respect to all the arrangements (arrangements a to 4), while the relative magnitudes of $Y_R$ among arrangements 2 to 4 are the same. This may be because the most of the raw materials are supplied from the fluid segments A and B having the higher concentration; the reaction between the fluid segments A and B having the higher concentration is therefore dominant in the reaction in the entire reactor; the rate of reaction between the fluid segments A and B having the higher concentration is increased with the increase in concentration; and diffusion control is thereby approached.

A concentration distribution in the microreactionchannel will next be considered. FIGS. 40A to 40D shows distributions of the molar fraction $Y_R$ of R in the microreactionchannel with respect to arrangements 1 to 4, and FIG. 41 shows the maximum value $y_R$, max of $Y_R$ in the microreactionchannel with respect to the arrangements of fluid segments A and B. The value $y_R$ is locally increased relative to that in the case of supply of the raw materials at the average concentration. Also in this case, part of R produced at the interface between the fluid segments A and B and diffused into the fluid segment B is immediately consumed by the reaction in the second stage (formula 4), but R diffused into the fluid segment A is maintained so that the concentration of R is locally increased. In arrangements 2 and 4 in particular, $y_R$ is increased in the vicinity of the surface of contact between the fluid segment A having the higher concentration and the fluid segment B having the lower concentration.

Thus, the method of forming fluid segments A and B so that fluid segments of each kind have different concentrations, and selecting the way of arranging these segments influences the yield ($Y_R$) of target product R. In other words, it is possible either to increase or to reduce the yield of R by suitably selecting the arrangement of fluid segments A and B differing in width. If R is a target product as in this embodiment, the yield of R can be increased. If secondary product S is a target product, the yield of S can be increased.

What is claimed is:

1. A method of multiple reaction in a microreactor in which a plurality of different fluids are caused to flow together into a microreactionchannel, and are mixed with each other by molecular diffusion to perform multiple reaction while being caused to flow as laminar flows, the method comprising:

distributing each of the plurality of different fluids to a plurality of fluid introduction channels;

selectively introducing each of the plurality of different fluids into the microreactionchannel through the plurality of fluid introduction channels which divide the plurality of fluids into a plurality of fluid segments in a diametral section at an entrance side of the microreactionchannel;

changing at least one of the diffusion distance and the specific surface area of the plurality of different fluids flowing together into the microreactionchannel by dividing each of the plurality of different fluids into a plurality of fluid segments in a diametral section of the microreactionchannel at the entrance side of the microreactionchannel, and by causing the plurality of fluid segments of the different fluids to contact each other in the microreactionchannel.

2. The method according to claim 1, wherein the number of the fluid segments is changed by the division.

3. The method according to claim 1, wherein the sectional shape of the fluid segments in the diametral section of the microreactionchannel at the entrance side is changed by the division.

4. The method according to claim 1,wherein the arrangement of the fluid segments differing in kind in the diametral section of the microreactionchannel at the entrance side is changed by the division.

5. The method according to claim 1, wherein a plurality of fluid segments having a rectangular sectional shape in the diametral section of the microreactionchannel at the entrance side is formed by the division, and the aspect ratio (the ratio of the depth to the width) of the fluid segments is changed by the division.

6. A method of multiple reaction in a microreactor in which a plurality of different fluids are caused to flow together into one microreactionchannel via respective fluid introduction channels, and are mixed with each other by molecular diffusion to perform multiple reaction while being caused to flow as laminar flows, the method comprising:

distributing each of the plurality of different fluids to the plurality of fluid introduction channels;

selectively introducing each of the plurality of different fluids into the microreactionchannel through the plurality of fluid introduction channels;

dividing each of the plurality of different fluids into a plurality of fluid segments forming rectangular sectional shapes in a diametral section of the microreactionchannel at the entrance side of the microreactionchannel;

arranging the plurality of fluid segments of the different fluids so that the plurality of fluid segments of the different fluids contact each other; and changing a width of the arranged plurality of fluid segments of the different fluids in a direction of arrangement.

7. A method of multiple reaction in a microreactor in which a plurality of different fluids are caused to flow together into one microreactionchannel via respective fluid introduction channels, and are mixed with each other by molecular diffusion to perform multiple reaction while being caused to flow as laminar flows, the method comprising:

distributing each of the plurality of different fluids to the plurality of fluid introduction channel;

selectively introducing each of the plurality of different fluids into the microreactionchannel through the plurality of fluid introduction channels;

dividing each of the plurality of different fluids into a plurality of fluid segments forming rectangular sectional shapes in a diametral section of the microreactionchannel at the entrance side of the microreactionchannel;

arranging the plurality of fluid segments of the different fluids so that the plurality of fluid segments of the different fluids contact each other with a specified width; and changing a concentration of the plurality of fluid segments of one fluid of the plurality of different fluids in the arranged fluid segments.

* * * * *